(12) United States Patent
Kirk et al.

(10) Patent No.: US 11,425,863 B2
(45) Date of Patent: Aug. 30, 2022

(54) ROUND BALE WEIGHING METHOD AND SYSTEM

(71) Applicant: CLEMSON UNIVERSITY RESEARCH FOUNDATION, Clemson, SC (US)

(72) Inventors: Kendall R. Kirk, Aiken, SC (US); H. Guy Ramsey, IV, Sharon, SC (US); Perry J. Loftis, Starr, SC (US)

(73) Assignee: Clemson University Research Foundation, Clemson, SC (US)

( * ) Notice: Subject to any disclaimer, the term of this patent is extended or adjusted under 35 U.S.C. 154(b) by 926 days.

(21) Appl. No.: 15/209,896

(22) Filed: Jul. 14, 2016

(65) Prior Publication Data

US 2017/0013783 A1  Jan. 19, 2017

Related U.S. Application Data

(60) Provisional application No. 62/192,298, filed on Jul. 14, 2015.

(51) Int. Cl.
*A01F 15/07* (2006.01)
*A01B 79/00* (2006.01)
(Continued)

(52) U.S. Cl.
CPC .......... *A01F 15/071* (2013.01); *A01B 79/005* (2013.01); *A01D 89/006* (2013.01);
(Continued)

(58) Field of Classification Search
CPC .................................................. A01B 79/005
See application file for complete search history.

(56) References Cited

U.S. PATENT DOCUMENTS 3,469,634 A   9/1969  Whitesides
3,565,178 A   2/1971  Whitfield
(Continued)

FOREIGN PATENT DOCUMENTS

EP        2 745 675 A1 *  6/2014
WO     WO 01/00005 A2 *  1/2001
WO     WO2014/197973 A1  12/2014

OTHER PUBLICATIONS

Fravel, et al.; "Development and Testing of an Impact Plate Yield Monitor for Peanuts," 2013 ASABE Annual International Meeting; Paper No. 1620969, Jul. 21-24, 2013, (10 pages).
(Continued)

*Primary Examiner* — John E Breene
*Assistant Examiner* — Jeffrey C Morgan
(74) *Attorney, Agent, or Firm* — Kim and Lahey Law Firm, LLC; Douglas W. Kim; Seann P. Lahey

(57) ABSTRACT

Yield monitoring systems for round baling machines and methods that can provide weight estimations for round bales at the time of formation are described. Balers can include those that incorporate hydraulically actuated bale kicking or pushing assemblies as well as those that incorporate spring-loaded off ramps. Farm implements including baling machines and cotton module builders are encompassed. The system includes a sensor that can ascertain a physical parameter associated with ejection of a round bale from the farm implement. Physical parameters as may be ascertained can include pressures, velocities, accelerations, etc. associated with bale ejection.

21 Claims, 16 Drawing Sheets

(51) Int. Cl.
*A01D 89/00* (2006.01)
*A01F 15/08* (2006.01)
*G01G 17/00* (2006.01)
*G01G 17/02* (2006.01)
G01B 17/00 (2006.01)
G01B 11/00 (2006.01)

(52) U.S. Cl.
CPC ...... *A01F 15/0825* (2013.01); *A01F 15/0883* (2013.01); *G01G 17/00* (2013.01); *G01G 17/02* (2013.01); A01F 2015/077 (2013.01); A01F 2015/0891 (2013.01); G01B 11/00 (2013.01); G01B 17/00 (2013.01)

(56) References Cited

U.S. PATENT DOCUMENTS

| | | | |
|---|---|---|---|
| 3,595,078 | A | 7/1971 | Beck |
| 4,230,188 | A | 10/1980 | Paulk |
| 4,280,419 | A | 7/1981 | Fischer |
| 4,362,097 | A * | 12/1982 | Rogers ................ A01F 15/0833 100/88 |
| 4,765,190 | A | 8/1988 | Strubbe |
| 4,821,637 | A | 4/1989 | Viaud |
| 4,933,589 | A | 6/1990 | Strubbe |
| 5,282,389 | A | 2/1994 | Faivre et al. |
| 5,343,761 | A | 9/1994 | Myers |
| 5,585,626 | A | 12/1996 | Beck et al. |
| 5,739,429 | A | 4/1998 | Schmitkons et al. |
| 5,887,669 | A | 3/1999 | Ostler et al. |
| 6,003,387 | A | 12/1999 | Larson et al. |
| 6,073,550 | A | 6/2000 | Goossen et al. |
| 6,192,664 | B1 | 2/2001 | Missotten et al. |
| 6,223,848 | B1 | 5/2001 | Young et al. |
| 6,272,819 | B1 | 8/2001 | Wendte et al. |
| 6,431,981 | B1 | 8/2002 | Shinners et al. |
| 6,457,295 | B1 * | 10/2002 | Arnold ................ A01F 15/0833 177/135 |
| 6,460,008 | B1 | 10/2002 | Hardt |
| 6,525,276 | B1 | 2/2003 | Vellidus et al. |
| 6,675,561 | B2 | 1/2004 | Davis et al. |
| 6,809,821 | B2 | 10/2004 | Thomasson et al. |
| 6,820,459 | B2 | 11/2004 | Beck et al. |
| 6,988,857 | B2 | 1/2006 | Kroemmer et al. |
| 7,146,294 | B1 * | 12/2006 | Waitkus, Jr. .......... B30B 9/3007 702/188 |
| 7,249,449 | B2 | 7/2007 | Goering et al. |
| 7,743,590 | B1 | 6/2010 | Gidden et al. |
| 7,815,001 | B2 | 10/2010 | Liljeblad et al. |
| 7,873,456 | B2 | 1/2011 | Erdmann et al. |
| 8,504,310 | B2 | 8/2013 | Landphair et al. |
| 2007/0039303 | A1 | 2/2007 | Mitchel |
| 2009/0223196 | A1 * | 9/2009 | Smith ................ A01F 15/0883 56/341 |
| 2013/0317696 | A1 | 11/2013 | Koch et al. |
| 2014/0076218 | A1 | 3/2014 | Liu |

OTHER PUBLICATIONS

Free, et al.; "Testing of an Impact Plate Yield Monitor for Peanuts: Mounting Configurations and Air Pressure Correction," 2014 ASABE Meeting Presentation, Paper No. 1914021; Jul. 13-16, 2014; (6 pages).

Monfort; Peanut Money-Maker Production Guide—Clemson University—2013, (77 pages).

Omer, et al.; "Comparative Study on Different Peanut Digging Blades," *Agric. Mech. Asia. Afr. Lat. Am.* (Jun. 2001) 32(3) pp. 43-45.

Penirschke, et al.; "Microwave mass flow meter for pneumatic conveyed particulate solids," Conference Paper—Microwave Flow Meter / Internet www.researchgate.net/publication/224564814_Microwave_mass_flow_meter_for_pneumatic_particulate_solids. Dated Jun. 9, 2015 (2 pages).

Roberson; "Improving Harvesting Efficiencies for Peanut Diggers,:" N.C. State University; (downloaded from Web on Aug. 24, 2016); (1 page).

Thomasson, J.A., et al.; "Optical Peanut Yield Monitor Development and Testing," Publication 2006 American Society of Agricultural and Biological Engineers ISSN 0883-8542, (10 pages).

Warner, et al.; "Variable Depth Peanut Digger: Part I—Design and Testing," 2014 ASABE and CSBE/SCGAB Annual International Meeting; Paper No. 1914163, Jul. 13-16, 2014, (7 pages).

Warner, et al.; "Variable Depth Peanut Digger: Part II—Digging Loss Analysis," 2014 ASABE and CSBE/SCGAB Annual International Meeting; Paper No. 1914272, Jul. 13-16, 2014, (7 pages).

* cited by examiner (a)

(b)

(a)

(b)

(a)

(b)

ROUND BALE WEIGHING METHOD AND SYSTEM

CROSS REFERENCE TO RELATED APPLICATION

This application claims filing benefit of U.S. Provisional Patent Application Ser. No. 62/192,298 having a filing date of Jul. 14, 2015, which is incorporated herein by reference.

BACKGROUND OF THE INVENTION

As the need for agricultural efficiency and productivity continues to increase producers must find ways to maximize their crop's potential. Economic drivers arise from increases in fertilizer and herbicide cost, and environmental drivers call for improved pesticide and water management. Precision agriculture concepts and methods are showing great promise in meeting the world's needs for efficient agricultural practices and are becoming a staple in most row crop producers' management strategies. For instance, cotton and corn producers are using yield monitors to define and assess different zones of production and are managing these zones with variable rate application of inputs. Application of yield monitoring technologies to the production of cotton and corn has improved crop management and profits as they allow the producer to make real time adjustments to management strategy when the yield goals for zones are not met. Through such strategies producers are making progress in increasing yield while decreasing cost and field inputs.

Hay and forages are an important part of the agricultural infrastructure particularly as livestock feed, which makes up a great deal of agricultural industry worldwide. Unfortunately, hay and forages have seen limited commercial applications of precision agriculture technology. The development of precision agriculture devices and methods that would be applicable to the harvest of baled crops could improve crop management and profits in this industry similar to what has been shown for other crops.

For instance, knowledge of hay bale weights at the time of production could be valuable information to producers. Such information could be used to assess and direct management decisions, evaluate input costs as a function of revenue potential by field and cutting, suggest when bales may exceed a critical moisture content, document historical production potential for land rent and crop insurance purposes, provide calibration information for mass flow sensors, along with a multitude of other applications. Moreover, when coupled with GPS logging capabilities, bale weights could be used in the absence of a mass flow sensing system to make a basic yield map for hay, demonstrating total weight by area, such as when distributed across a grid.

In an attempt to improve yield monitoring of baled crops, weighing mechanisms have been implemented on round hay balers, but developed systems are quite expensive. For instance, one system includes a load cell weight system on the baler axle in combination with inclinometers. The inclinometers are used to compensate for gravitational forces due to the ground not being level at the location where the bale is ejected from the baler. This load cell method for weighing hay bales has also been implemented on large square balers as well as round balers. Unfortunately, the load cell weighing system is a costly addition to a baler and would likely be hard to retrofit to an older model without expensive modifications, such as changing the entire axle or wheel spindle assembly and modifying the tongue of the baler with a load bar. Another system includes load sensing devices mounted in the bale chute that measure weight as the bale passes over them. These systems have been utilized on both large and small square balers, but are not known on round balers.

Hydraulic mechanisms have also been studied for determination of bale weights. For instance, West Virginia University Extension researched this particular topic, by examination of a pressure gauge addition to a bale loader. As a formed bale was picked up by the loader, the hydraulic pressure increased until there was enough pressure to sustain the load. Another approach utilized hay forks on a three-point-hitch of a tractor that included a hydraulic top link. The circuit that operated the top link included a pressure gauge. The hay bales were lifted individually with the fork on the back of the tractor and as the bale rose, hydraulic pressure increased. When the pressure stabilized, it was recorded and the bale was weighed.

While the above describes improvement in the art, room for further improvement exists. A need exists for yield monitoring technology devices and methods that can be used to improve management capabilities in harvesting of baled crops. The successful development of commercially available devices and methods that can be utilized in on-the-go determination of bale weights will translate to improved direction of management decisions, which will result in increases in profit and production.

SUMMARY OF THE INVENTION

In accordance with one embodiment of the present disclosure, a system is disclosed for determining the weight of a round bale during harvesting. More specifically, a system can include a sensor that can be configured to determine a physical parameter that is associated with ejection of the bale from a farm implement, e.g., a baler or other bale-associated implement. For instance, in one embodiment the sensor can detect a pressure associated with ejection of the bale from a harvester, e.g., the pressure of a hydraulically actuated bale kicker. In another embodiment, a sensor can detect a velocity and/or an acceleration of a bale off-ramp. The system can also include a processor that can process the data obtained by the sensor and determine the weight of the bale as it is being ejected.

Also disclosed are methods for determining the weight of a round bale as it is being ejected from a farm implement. A method can include ascertaining by use of a sensor a physical parameter associated with ejection of the round bale (e.g., a pressure, a velocity, an acceleration, etc.). For example, the sensor can determine a peak pressure of a bale kicker, a rotational velocity of an off-ramp, or an acceleration of an off-ramp. A method can also include processing that information to determine the bale weight.

Beneficially, the systems and methods can provide on-the-go data as well as long-term data to users. For example, the systems and methods can be utilized in conjunction with a global positioning system (GPS) to develop crop yield maps and to obtain other useful information for part of a field or for an entire field in both real time and over multiple growing seasons. Moreover, systems can easily be provided on a farm implement (e.g., a baler) by original equipment manufacturers (OEM) or as an aftermarket retrofit.

Other features and aspects of the present disclosure are set forth in greater detail below.

BRIEF DESCRIPTION OF THE DRAWINGS

A full and enabling disclosure of the subject matter, including the best mode thereof, directed to one of ordinary skill in the art, is set forth more particularly in the remainder of the specification, which makes reference to the appended figures in which.

DETAILED DESCRIPTION

Figure 1:
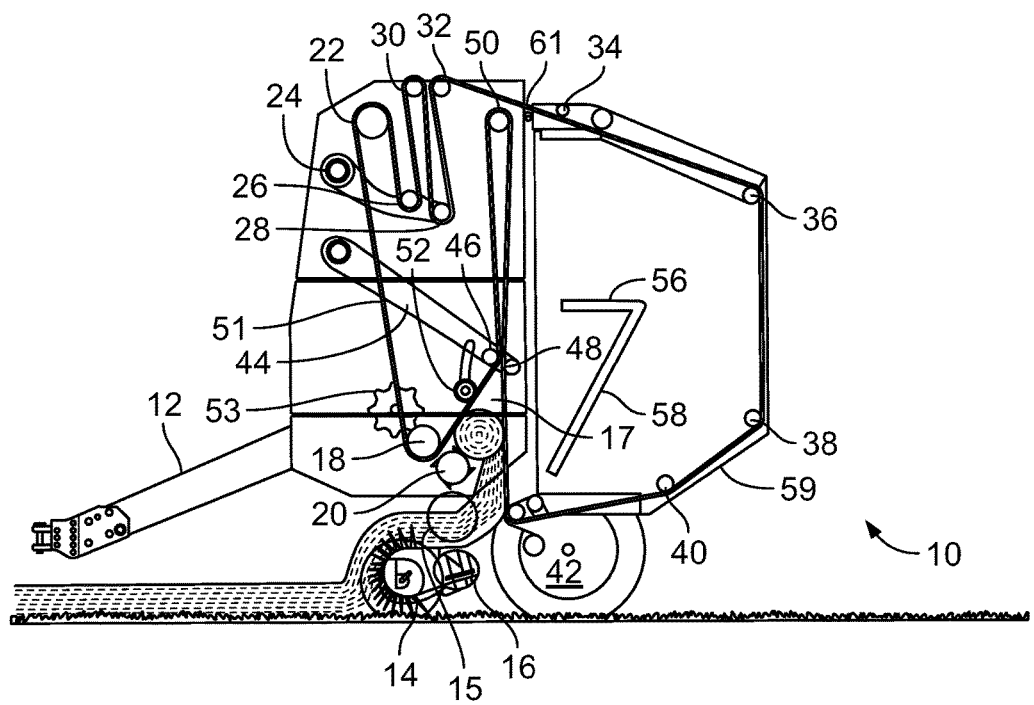
FIG. 1 is a side view of a typical round baler incorporating a hydraulic bale kicker.

It is to be understood that the terminology used herein is for the purpose of describing particular embodiments only and is not intended to limit the scope of the present invention. The present discussion is a description of exemplary embodiments only, and is not intended as limiting the broader aspects of the present invention.

Generally speaking, the present disclosure is directed to bale weight estimation systems for use on farm implements including, without limitation, balers and round cotton module builders, and methods that can provide both on-the-go and long-term yield monitoring of baled crops. More specifically, disclosed systems can be utilized to determine the weight of a round bale. A round bale is defined herein and throughout this disclosure to include round bales such as those formed by round hay balers and round bales of cotton such as those formed by round module builders for cotton harvest. The systems and methods utilize sensors strategically placed on a farm implement to indirectly determine the bale weights through measurement of physical parameters associated with the ejection of the bale from the implement. This technology has the ability to allow a grower to have the knowledge of field production at an affordable cost. It also can provide the ability to generate yield maps, for instance when paired with a GPS, or to provide data for calibration of a crop mass flow sensing system.

The majority of the following discussion is directed to the baling of agricultural crops, which can include, without limitation, hay, forages, small grains, straw from grains, pine straw, and peanut vines. Hay and forages can include any grass or mixture of grasses as are generally known in the art including, without limitation, ryegrass, timothy, brome, fescue, Bermudagrass, orchard grass, switchgrass, bahiagrass, big bluestem, little bluestem, indiangrass, gamagrass, pearl millet, reed canary grass, Teff, wheatgrass, blue grama, and meadowgrass. A hay may also or alternately include legumes, such as alfalfa (lucerne), clovers (red, white and subterranean), Trefoil, perennial peanut, lespedeza, vetch, soybean, and cowpeas. Other pasture forbs can be included in a hay mix, as is known. Baled small grains can include, without limitation, rye, oat, wheat, triticale, barley, and canola. It should be understood, however, that disclosed systems can also be utilized in determining the weight of other baled crops, e.g., round cotton modules, straw from small grains, peanut vines, and pine straw.

The systems can be quite accurate. For instance systems can exhibit an error rate with regard to actual bale weight of about 15% or less, about 10% or less, about 8% or less or about 6% or less in some embodiments. For example, average absolute error can range from about 1% to about 7.5% in some embodiments, from about 2.5% to about 9.5% in some embodiments, or from about 1% to about 6% in some embodiments.

Beneficially, the components of a system can be easily installed in existing baling machines and the system can be low maintenance and provide long-term use. This can allow for retrofit packages of the systems that can be easily adapted to and maintained on balers.

There are three major cycles in the operation of a round baler. These are forming the bale, wrapping the bale, and ejecting the bale. Typically, in the forming cycle the operator lowers the crop pickup device located at the front edge of the baler, starts the bale forming belts and drives the tractor forward so that the crop pick-up can lift the crop into the baler. As the baler moves forward a hay bale is created within the bale chamber. To prevent uneven bale formation, the operator follows a driving pattern that includes veering from the right of the center of the windrow to the left of the center of the windrow. Once the bale is fully formed, the operator can be informed, for instance via sensors located in the baling chamber following which the wrapping cycle may be started, either automatically or by the operator. During the wrapping cycle forward motion along the windrow is stopped and a wrapping material (e.g., mesh, plastic, or twine) is wrapped around the bale using an automated mechanism. Once wrapping is complete, the bale ejecting cycle begins in which the bale chamber is opened, typically by lifting a tailgate, and the wrapped bale falls, is pushed, or is otherwise ejected out of the bale chamber.

A round cotton module builder is a cotton harvester that forms bales of cotton in a similar fashion as a hay baler operates; harvested cotton is accumulated in a chamber on the self-propelled cotton picker to form a cylindrical core. As additional cotton is harvested it is rolled and compacted into a bale around the core. Bales of cotton formed in this manner are commonly also referred to as round cotton modules. Once the cotton bale is built to the required size, it is wrapped with plastic and ejected to a rear module handler after the baling chamber is opened.

The bale weighing systems disclosed herein include a sensor that can determine a physical parameter associated with ejection of a round bale from a farm implement such as a baler or cotton module builder. Beneficially, the systems can be useful with any type of ejection system, e.g., falling or pushing of the bale from the bale chamber. Moreover, disclosed methods and systems can be utilized in determining the weight of round bales of any size and utilizing any method of wrapping as is known in the art.

In one embodiment, the system can include a pressure sensor that can determine the pressure imposed by a bale as the bale exits the chamber, which is directly proportional to the bale weight. In another embodiment, the system can include a sensor can detect an acceleration or a velocity associated with a bale that is in motion. This type of sensor can thus be capable of indirectly determining the force associated with catching or directing the motion of a falling bale, which is also directly proportional to the bale weight. Of course, a system can also include multiple sensors, each of which can measure the same or different physical parameters associated with ejection of the bale from the baler. Through determination of one or more physical parameters associated with bale ejection, the bale weight can be estimated through correlation of bale weight with the particular detection datum and development of a processing algorithm according to standard methodologies.

In one embodiment, a system can include a sensor associated with a push-type ejection mechanism such as a hydraulically actuated bale push bar or hydraulic bale kicker. In this type of system, a sensor can determine a pressure associated with ejecting the bale from the baler. FIG. 1 illustrates a typical round baler that includes a hydraulically actuated bale push bar. Round balers of this general configuration are known in the prior art, as is exemplified by the structure disclosed in U.S. Pat. No. 5,855,167 issued to Goossen, et al., and U.S. Pat. No. 6,675,561 to Davis, et al, both of which being incorporated by reference herein.

Round baler 10 includes a front tongue 12 for connecting to a tractor (not shown). The tongue 12 of the baler also connects to power take off shaft of the tractor to supply energy as will be understood by one of ordinary skill in the art. The baler has a pick-up assembly 14 including a center-gathering stub auger 15. The baler also includes a stuffer assembly 16 for moving the crop into a bale chamber 17. Inside the baler are a lower drive roll 18 and a starting roll 20. Above the lower drive roll 18 is the upper drive roll 22. Pivotally mounted within the baler is a belt tension arm 24 to which are pivotally mounted the front belt tension roll 26 and the rear belt tension roll 28. At the top of the front portion of the bale chamber is a front upper idler roll 30 and a rear upper idler roll 32. Following the interior of the baler wall around clockwise, there is a tailgate belt roll 34, an upper rear tailgate roll 36, a lower rear tailgate roll 38, a lower tailgate idler roll 40, and two front lower idler rolls 42. A bale density arm 44 is pivotally mounted within the baler and has a front bale density roll 46 and a rear bale density roll 48, both pivotally mounted on the distal end from the pivotal mounting of the bale density arm 44. Near the top of the bale chamber above the bale density rolls is an upper bale chamber roll 50. A plurality of bale forming belts 51 (one shown in profile) are threaded around each of the above identified rolls as depicted in FIG. 1. The bale forming belts are tensioned by the front and rear belt tension rolls 26, 28, the rolls 46, 48 mounted on the bale density arm 44, and three of the belts are also affected by a bale shape assembly wheel 52. Also shown in profile is one of a plurality of rienks 53 which help keep the forming belts clean.

At the rear end, the baler 10 includes a tailgate 59 that opens and closes around pivot point 61. A bale kicker assembly 56 is associated with the tailgate. The bale kicker assembly includes the bale push bar 58 (depicted in its home position) and two hydraulic cylinders (not shown in FIG. 1). As the tailgate rises, hydraulic pressure is applied to the base end of the kicker hydraulic cylinders. The bale push bar 58 rises upward and rearward pushing a bale (not shown in FIG. 1) away from the tailgate 59 as the tailgate closes. After the tailgate is closed the kicker assembly 56 is returned to its home position.

Figure 2:
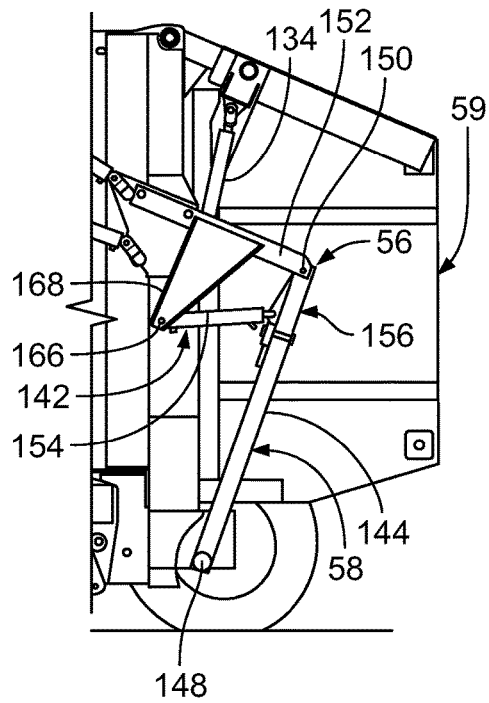
FIG. 2 is a side view of an end portion of a round baler illustrating a bale kicker in a contracted position.
Figure 3:
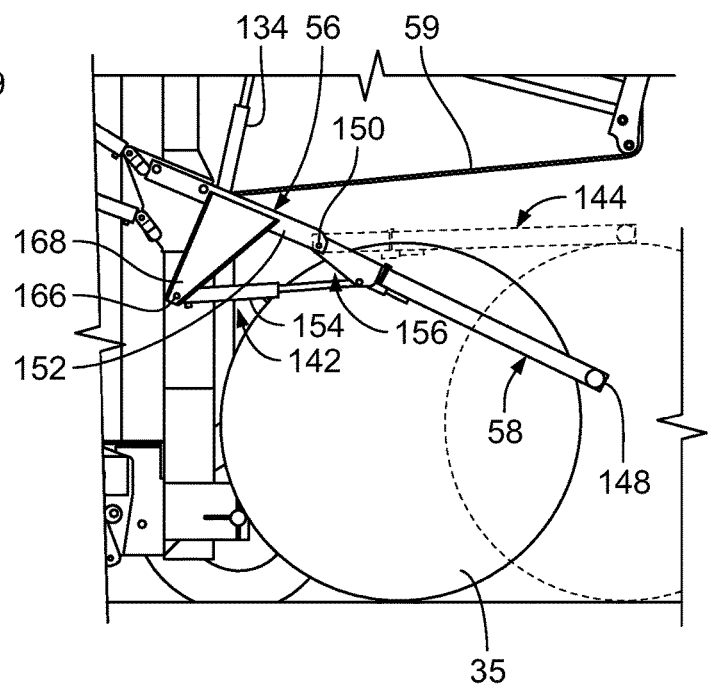
FIG. 3 illustrated the bale kicker of FIG. 2 in an extended position.

FIG. 2 shows the end portion of a baler with the kicker assembly 56 in the home position, and FIG. 3 shows the kicker assembly 56 in the extended position. As shown, when the tailgate 59 is raised as in FIG. 3, the finished bale 35 may be pushed out of the bale chamber by use of the push bar 58 of the kicker assembly 56 and fall onto the ground. A hydraulic lift cylinder 134 can be used for opening and closing the tailgate 59.

As shown in FIG. 3, when the bale 35 drops out of the chamber, it is initially directly underneath the opened tailgate 59. The bale kicker assembly 56 includes two main parts, i.e., a push bar 58 and an actuator 142, The push bar 58 takes the form of a generally U-shaped swing having a pair of generally upright arms 144 (only one of which is visible in FIG. 2 and FIG. 3) and a transverse crosspiece 148 that interconnects the arms 144 at their lower ends. The push bar 58 is swingably connected to support member 152 by a pair of transverse horizontal pivots 150 on opposite sides of the baler. The pivots 150 are located at the lower rear ends of a pair of downwardly and rearwardly inclined support members 152 on opposite sides of the baler, each support member 152 being rigidly affixed to the chassis. The actuator 142 of the bale kicker assembly 56 includes a pair of double-acting hydraulic cylinders 154 (only one being shown) on opposite sides of the baler and a pair of brackets 156 swingably attached to the support members 152 by the same pivots 150 used for the push bar 58. The other end of the cylinder 154 has a pivotal connection 166 with a triangular mounting plate 168 that is rigidly affixed to and projects downwardly and forwardly from the corresponding cantilevered support member 152.

Figure 4:
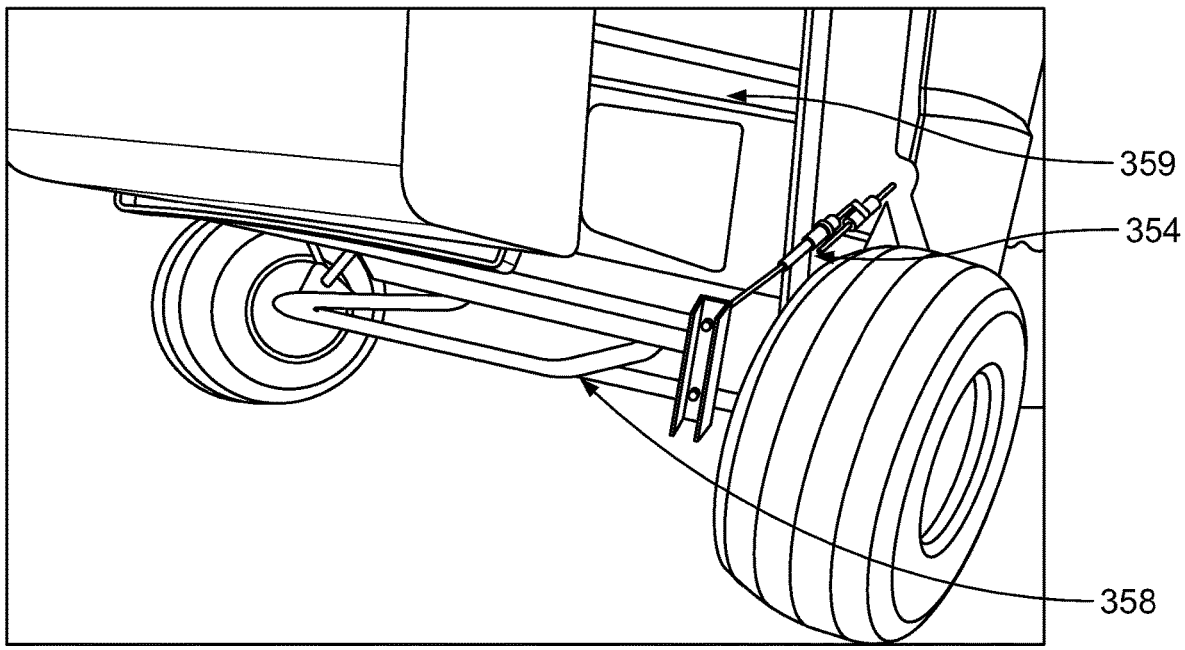
FIG. 4 illustrates another style of a bale kicker as may be utilized with disclosed systems.
Figure 5:
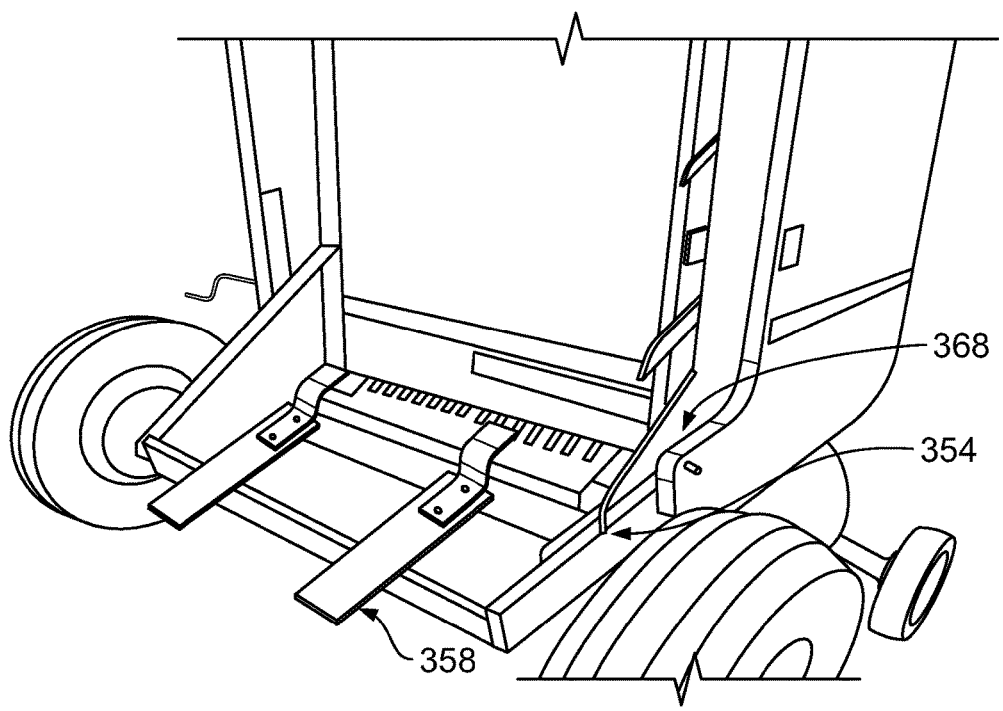
FIG. 5 illustrates the bale kicker of FIG. 5 with the bale chamber tailgate open.

FIG. 4 and FIG. 5 illustrate another typical push-type ejection mechanism as may incorporate a system as described. This system incorporates a hydraulic bale ramp (also commonly referred to as a bale kicker) 358 that can function by pushing a bale away from the machine after the bale chamber tailgate 359 opens and the bale (not shown in FIG. 4 or FIG. 5) rolls out and contacts the bale ramp 358. The bale formation and interior components of the baler can be similar to those as described above for a push-bar system. During use, and upon formation of the finished, wrapped bale, the tailgate 359 can rise and the hydraulically actuated cylinder 354 can be actuated causing the bale ramp 358 to push upwardly, thereby pushing the formed bale away from the baler.

Figure 6:
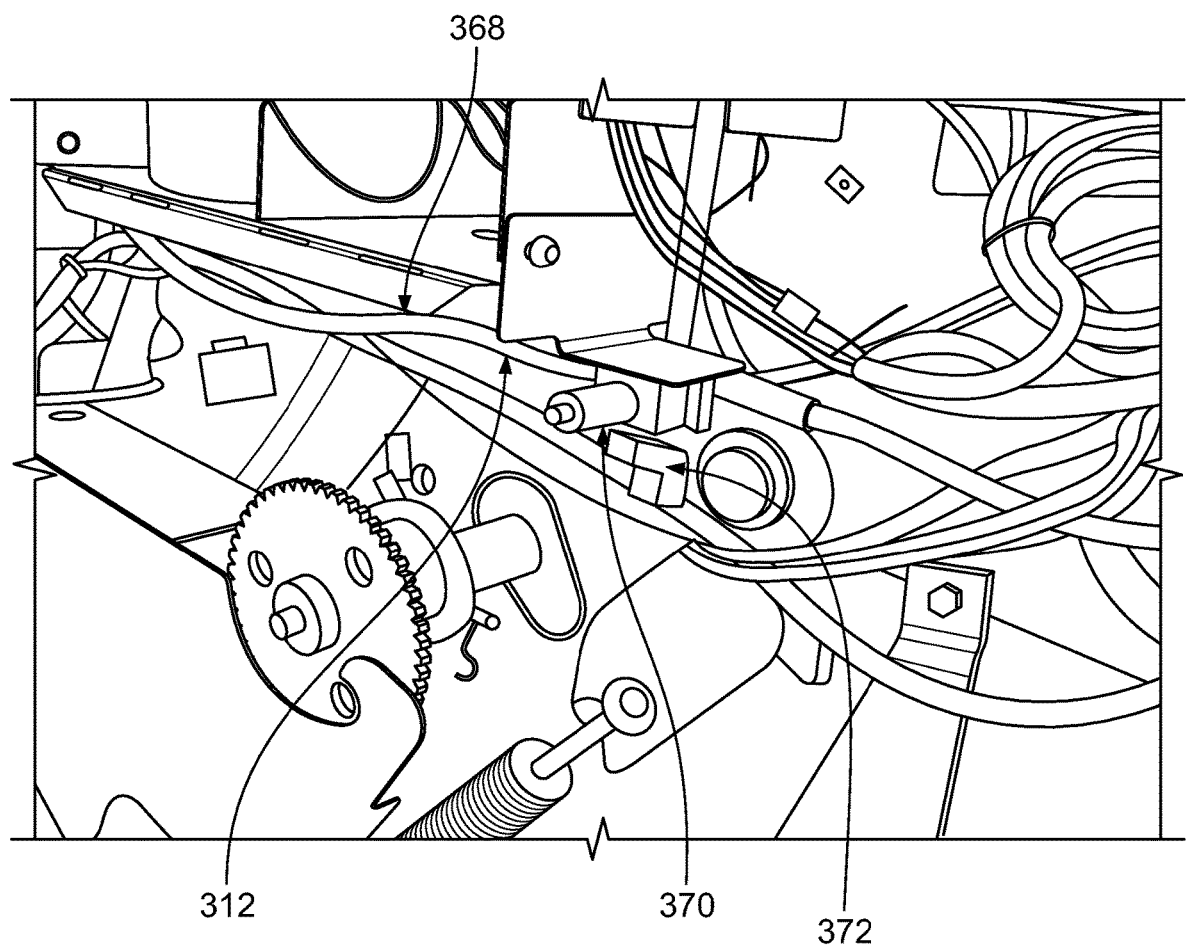
FIG. 6 illustrates a location for placement of a pressure transducer in communication with a bale kicker hydraulic line.

In accord with a push-type ejection mechanism, a pressure transducer can be associated with an actuator, e.g., the hydraulically actuated cylinder 354 that actuates the bale ramp 358. A pressure transducer can be in hydraulic communication with the cylinders 354 at any convenient location on a baler. For instance, as illustrated in FIG. 6, a "tee" fitting 312 can be added to a hydraulic line 368 that is connected to the cap end of the cylinder 354 and the pressure transducer 370 can be connected to the tee 312 in conjunction with necessary electrical connections 372. A hydraulic pressure transducer 370 can operate much like a pressure gauge in that there can be a linear sensor response as a function of pressure that can be sensed and transmitted to computer or data logger. Beneficially, the signal and sensor reading can be taken without having to manually record it.

The inclusion of a pressure transducer on the hydraulic circuit utilized for the cylinder extension can provide a route to record response throughout a bale ejection cycle. This information can then be utilized to predict bale weight, for instance by algorithm development and associated processing in conjunction with predetermined calibration factors that can be drawn between sensor reading, bale kicker pressure, and weight.

Additional input data for a processor that can serve to decrease error can include wrap type, e.g., twine wrap versus net wrap, ejection surface data, e.g., contact area, inclination, e.g., flat versus positive or negative incline, etc.

As described in more detail in the example, section below, utilization of a pressure transducer associated with a bale kicker assembly can be highly effective in prediction of bale weight from a round hay baler. For example, in some embodiments the average absolute error median range can be between about 3% and about 6%.

By way of example, and without limitation, an algorithm for use in determining the bale weight from information obtained from a sensor can initially recognize a peak in the incoming data. For instance, a peak in pressure data can be defined as a point where the input is greater than the previous and following input readings.

In general, a processing system can recognize and utilize first, second, and/or third order peaks in the incoming data. A first order peak is generally defined as an input point having a value that is greater than the one point prior and one point following the data point. A second order peak is a data point for which the value is greater than the two points prior and two points following the data point; a third order peak is a data point having a value that is greater than the three points prior and three points following. These references to classifications of peaks are shown for example only and are not intended to be limiting; as commonly known to those skilled in the art, sensor response resolution and range can be manipulated to affect definition of peak classifications, as described above.

Programming logic steps of a data processing algorithm can include multiple steps. One non-limiting example of useful programming logic steps can include the following five step series:

Step 1: Collect Pressure Values

An exemplary logic routine for this step can include:
If bale chamber is open . . .
Collect analog pressure values "on sensor change" events, store as temporary list or array (base 0) of n=about 200 values. As an example, a "sensor change" event could be defined as a sensor response demonstrating a difference from the previously sensed value equal to at least $\frac{1}{1000}$ of the full scale sensed range.
E.g. P(0), P(1), P(2), . . . P(n)
End if Step 2: Define $3^{rd}$ Order Peaks This step can be carried out upon a bale chamber close event (e.g., upon a digital input change that denotes closure of the chamber.)

Upon this closure, the processor can cycle through an array of n pressure values and thereby define $3^{rd}$ order peaks as a temporary list or array (base 0) of (for example) m=about 8 values (m denotes peak number). For example:

```
m = 0
For i = 3 to (n−4)
    If P(i) > P(i−1) and P(i) > P(i−2) and P(i) > P(i−3) and
    P(i) > P(i+1) and P(i) > P(i+2) and P(i) > P(i+3) Then
        Peak(m) = P(i)
        m = m+1
    End If
Next i
```

Note that third order peaks are not limiting classifications for use in this logic sequence and are demonstrated for example only.

Step 3: Define Max $3^{rd}$ Order Peak

In this step, the algorithm can cycle through the array of $3^{rd}$ order peaks, for example according to the following:

```
MaxPeak = 0    (Defines value of max peak)
MaxPeakPosition = nothing    (Defines array position of max peak)
For i = 0 to (m−1)
    If Peak(i) > MaxPeak Then
        MaxPeak = Peak(i)
        MaxPeakPosition = i
    End If
Next i
```

Step 4: Define Pressure Value of Interest

In this step, the value X can be defined as a pressure value of interest for particular bale. The MaxPeakPosition (from step 3) can provide the pressure for full extension of the cylinder. As such, (MaxPeakPosition−1) can represent the last peak prior to full extension:

$$X=\text{Peak}(\text{MaxPeakPosition}-1)$$

Step 5: Calculate Bale Weight Using Stored Calibration Coefficients

To determine the estimated bale weight Y, predetermined calibration values can be utilized. For instance, in the following, m1 is defined as a calibration slope coefficient and b is defined as calibration intercept coefficient. Research to evaluate/define default calibration coefficients would be within the capabilities of one or ordinary skill in the art and as such is not described in detail herein (e.g., the calibration equation could be a linear regression model with a non-zero y-intercept, a linear regression model through the origin or with y-intercept equal to zero, a multiple linear regression model with more than one independent variable including or not including transformations of the independent variable(s), or a non-linear regression equation). Accordingly, the estimated bale weight can be:

$$Y=m1*X+b$$

In a similar embodiment, round cotton bales can be weighed using a pressure transducer in communication with the hydraulic circuit that actuates the rear module handler on ejection of the round cotton bales from a round module builder. The data from the pressure transducer used in conjunction with the module handler can be processed similar to that as described above when used in conjunction with a hydraulic bale kicker. For instance, additional input data to a processor can include chamber tailgate position, calibration factors, round module builder inclination, and the like. Logic routines for use in programming a processor can likewise be similar to those described above, for example relating cotton bale weight to a specific hydraulic pressure peak.

A large percentage of round balers in use in the U.S., perhaps 50%, utilize a spring loaded bale ramp rather than a hydraulic bale kicker. Accordingly, another embodiment of a system as disclosed herein can incorporate a sensor that can be associated with a spring loaded off-ramp that is utilized in such balers. Such balers are known in the art and have been described, for instance in U.S. Pat. No. 4,821,637 to Viaud; U.S. Pat. No. 4,798,044 to Viaud, et al.; U.S. Pat. No. 6,807,901 to Bentzinger, et al.; and U.S. Patent Application Publication No. 2014/0174301 to Blough, et al.; all of which are incorporate by reference.

Figure 7:
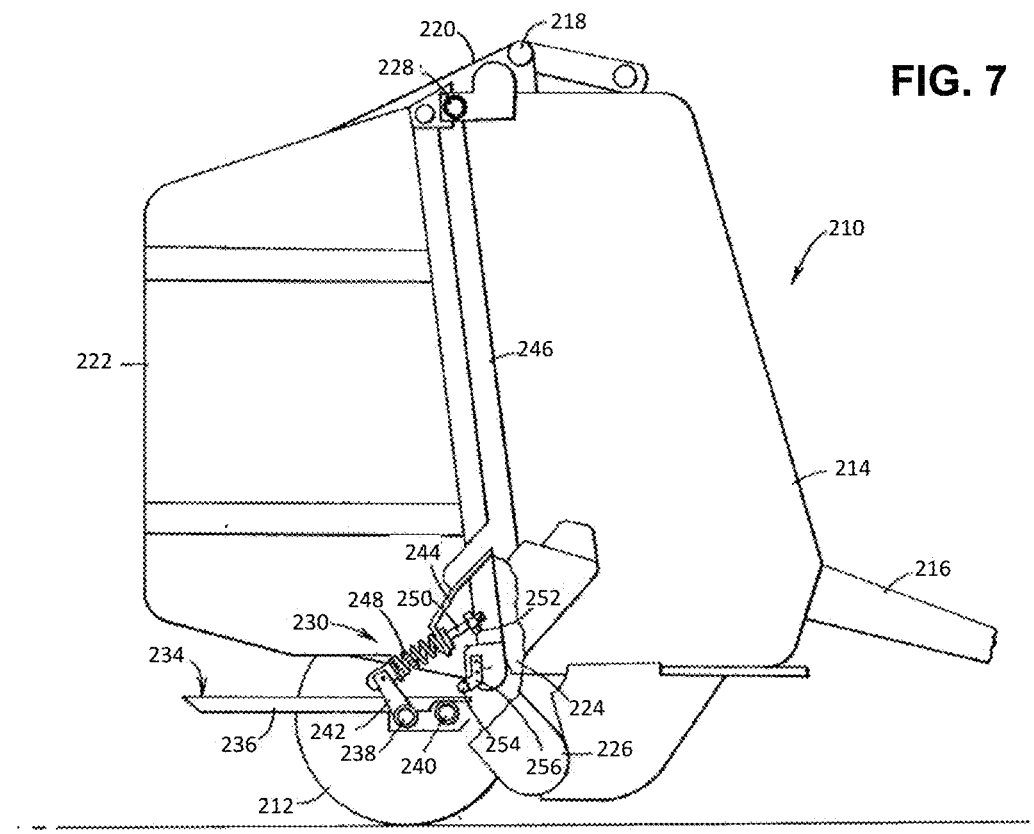
FIG. 7 illustrates a round baler including a spring-loaded off ramp in a closed configuration.
Figure 8:
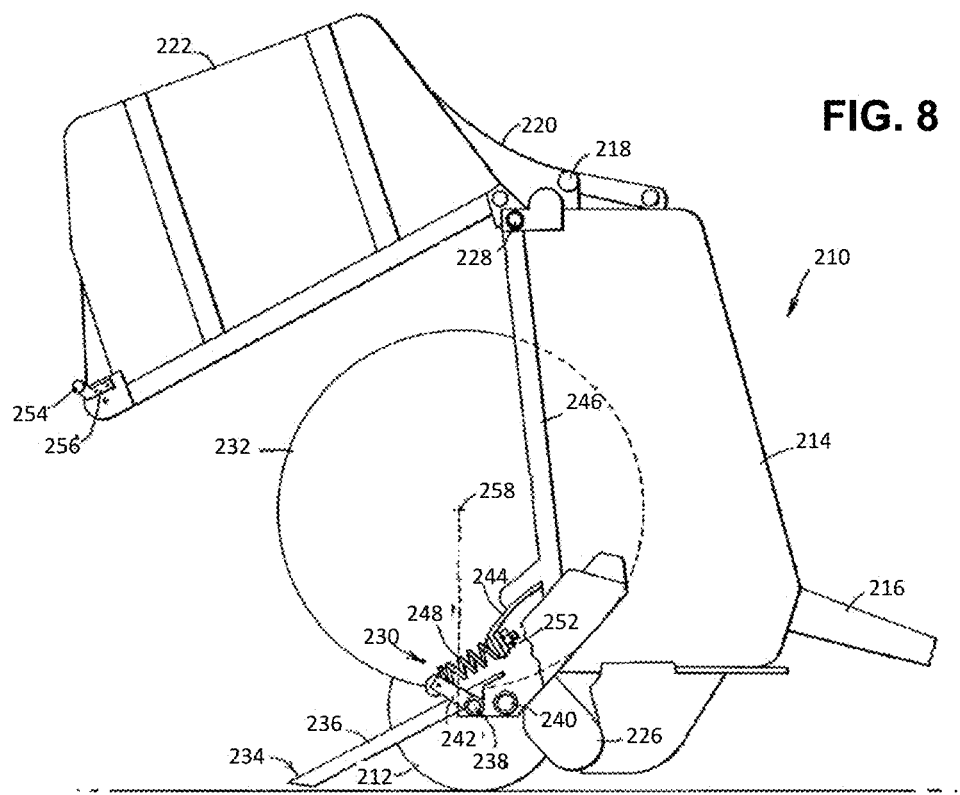
FIG. 8 illustrates a round baler including a spring-loaded off ramp in an open configuration.

One embodiment of a typical baler including a spring-loaded off ramp is illustrated in FIG. 7 in a closed configuration and in FIG. 8 in an open configuration. As shown, the baler includes a frame 210 mounted on a pair of wheels of which only one wheel 212 is shown. The frame 210 has an upright fore-and-aft extending wall 214 on either side connected by transverse beams (not shown). A tongue 216 is connected to a transverse beam at the front of the frame 210 and extends forwardly for attaching the baler to a tractor.

Mainly within the machine are a plurality of lateral rolls as described previously, e.g. roll 218, extends over its width carrying belts 220 which define the bale-forming chamber the ends of which are provided by the sidewalls 214 and a gate 222 and which has an inlet 224 for crop received from a pick-up 226. The gate 222 is can swing upward and rearward from its closed position in FIG. 7 about a pivot axis 228 to its open position in FIG. 8.

A support assembly 230 is provided for a bale 232 as shown in FIG. 8. This assembly includes an off-ramp 234 located below the closed gate 222 and above the level of the axle of wheel 212 for the completed bale 232. The off-ramp 234 can have multiple side beams 236, only one of which being shown, and extends rearward but generally does not protrude beyond the back of the gate 222. The off-ramp 234 is pivotally mounted at a position towards its forward end by way of a horizontal shaft 238. It is not necessary for the off-ramp 234 to be exactly horizontal in the FIG. 7 position, and if desired, it may have some downward slope of, for example, ten degrees.

A lever 242, rigid with the horizontal shaft 238, is disposed outwardly of the side beam 236 and extends up and back. A bracket 244 is attached to an upright beam 246, in front of the gate 222 and an adjustable compression spring 248 is mounted on a rod 250 pivotally connected to the upper end of the lever 242 and received through the bracket 244 so that it provides force against the off-ramp 234 moving downward. An adjustment nut 252 can be engaged on the upper end of the rod 250. Opposed to this spring bias is an abutment bar 254 that extends over the width of the machine in contact with the forward end of the off-ramp 234 and is rigid with a leg 256 (on both sides of the machine) bolted to a forward lower portion of the gate 222.

In operation, after the completed bale 232 has been formed and wrapped, the gate 222 is opened. The center 258 of the bale initially overlies a point on the off-ramp 234 just to the rear of the horizontal shaft 238. On opening of the gate 222, the abutment bar 254 will move back and up so that it rapidly moves out of contact with the off-ramp 234 enabling the off-ramp to be thrust downward immediately by the weight of the bale 232.

In this embodiment, a sensor capable of detecting the velocity and/or acceleration of the off-ramp 234 can be located in communication with the off-ramp 234. For instance, a gyrometer and/or an accelerometer can be located at or near the junction of the off-ramp 234 and the horizontal shaft 238.

Any sensor type may be utilized including, without limitation, a gyroscope, a magnetometer, a multi-axis accelerometer, or a magnetic angular rate and gravity (MARG) sensor. In one embodiment, a single sensor may be utilized that may correspond to a multi-axis accelerometer whose outputs may be used to calculate acceleration of the off-ramp as the bale is unloaded from the baler. Such sensors can detect angular rate of rotation, gravity, and earth magnetic field along all three perpendicular axes, these angular rates can then be integrated to obtain the acceleration of the off-ramp as the orientation of the sensor changes. Exemplary sensors as may be utilized can include, without limitation, an inertial sensor, such as the InertiaCube 3 sensor produced by InterSense Corporation (Bedford, Mass.), which is available in wireless or wired form, as well as smaller devices, including micro-electromechanical systems (MEMS) inertial sensors. In another embodiment, a single sensor may be utilized that may correspond to a multi-axis gyrometer the outputs of which may be used to indicate angular rate of rotation of the bale ramp.

The data from the sensor can be processed similar to that as described above when utilizing a pressure sensor in conjunction with a bale kicker. For instance, additional input data to a processor can include tailgate position, wrapping type, baler inclination, calibration factors, and the like. Logic routines for use in programming a processor can likewise be similar to those described above, for example relating bale weight to the peak rate of ramp acceleration or peak angular velocity.

In addition to the sensors and processing equipment, a system can include communication modules, control overrides, manual data entry ports, data output devices, and so forth as are generally known in the art. For instance, a system can include or be in wired or wireless communication with a graphic user interface located within a tractor or harvester cab for use with a harvester in order that an operator can follow the weight information provided by the system (e.g., individual bale weights, average bale weight, total bale weight, bale count, etc.). The system can include communications systems and processing software as is known in the art so as to be in communication with a global positioning system (GPS) that can provide information to the control system concerning location and/or weight of the bales as ejected from the baler or round module builder. The bale location information can then be processed in conjunction with the bale weight information to develop a yield map for the area.

Disclosed systems and methods provide producers with on-the-go bale weights and weight accumulation through a field, which in turn can provide an estimated value and crop removal rate on a field by field basis. Such knowledge could lead to improved direction of crop management decisions, ability to evaluate crop management decisions, improved nutrient utilization efficiency and therefore reduced environmental impacts, documentation for land rent and insurance claims, and ultimately increased profitability to the producer. Moreover, disclosed systems can be much more economically feasible and less complex as compared to known systems.

The present disclosure may be better understood by reference to the following examples.

Example 1

A model TDH30 pressure transducer (Transducers Direct, Cincinnati, Ohio) was installed on the hydraulic circuit for the bale kicker of a John Deere 458 round baler and a John Deere 459 Silage Special round baler. The bale kicker was actuated by a double acting hydraulic cylinder that automatically extended after the bale chamber was completely opened. FIG. 4 illustrates the circuit.

Data acquisition was completed through use of a program written in Microsoft Visual Basic 2010. A model 1018_2 interface kit (Phidgets Inc., Calgary, Alberta, Canada) was utilized for analog and digital inputs. A model 1020_0 GPS receiver (Phidgets Inc., Calgary, Alberta, Canada) was also used to record where each bale was ejected in the field. The pressure transducer was connected to one of the analog inputs on the interface kit. The pressure transducers were calibrated against an AFC-5M-25 pressure gauge (DiscountHydraulicHose.com, Philadelphia, Pa.) using pressure generated from a model 60726 portable hydraulic power kit (Harbor Freight Tools Co., Camarillo, Calif.).

The balers were also outfitted with model LJC18A3-B-Z/AX capacitance sensors at the wheel lugs that sensed movement. This was to keep the program from logging readings from the pressure transducer if the bale chamber was opened more than once in one position, such as in the event of maintenance or repairs. If the bale chamber was open and no forward motion of the baler occurred since the last bale opening event, then the data from the pressure transducer was logged at each change in sensor response that exceeded 1/1000 of the full scale of the sensor, or at about each 34.47 kPa (5 psi) change. This resulted in data logging rate generally being in the 30-50 Hz range. Each bale was then weighed using a hay wagon positioned on wireless truck scales. During harvest, the bale sizes were varied between 48 in., 54 in., and 60 in. Data was collected for bales that were net wrapped and twine wrapped, which was set with the bale monitor located in the cab of the tractor.

Figures 9, 10:
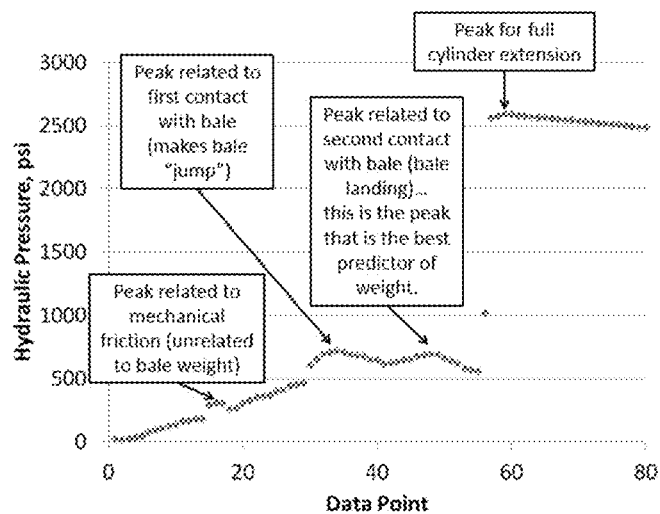
FIG. 9 presents screen captures of a data acquisition program used in one embodiment of a system.
FIG. 10 graphically illustrates identification of pressure peaks from raw data.

FIG. 9 presents screen captures of the data acquisition program during harvest. Under the title, "Bale Discharge," Kicker Pressure in (psi) is shown: 44.4 psi as shown at (a) was the operating pressure of the system while 815.8 psi as shown at (b) was the pressure indicated while the bale was being ejected.

Collected data was analyzed and trimmed to eliminate data collected after full extension of the hydraulic cylinder. The pressure relief for the bale kicker was approximately 2,500 psi so anything at or about 2,500 psi was omitted from the data. A singular dataset was collected for each bale and each of these datasets was analyzed to identify peaks in the pressure data. First, second, and third order pressure peaks as defined above were utilized. Analysis of the data across multiple bales suggested that the third order peaks were most consistently present and third order peaks were therefore designated for use in bale weight prediction. In order to visualize the peaks, the points were plotted with respect to time (FIG. 8) but a macro was written in Microsoft Excel providing the logic to identify these peaks automatically. After the pressure peaks were determined for each bale, the data was analyzed and regression models were formulated.

FIG. 10 displays raw data that was obtained from the pressure transducer. After data analysis the first peak was attributed to mechanical friction and assumed to have no effects on bale weight. It became obvious that a bale made contact with the hydraulic bale kicker twice throughout a cycle by generally displaying two peaks. After correlations were made, it was concluded that the second peak was the best regressor to use as a predictor of bale weight.

Data was collected from two independent hay fields and compared to determine the accuracy across plots. The fields were referred to as the "Banana field" and the "Bermuda field." The Bermuda field was irrigated while the Banana field was not. Each field was harvested between the beginning of May and the end of August with general moisture contents ranging between 10% and 20% as determined by use of a moisture probe.

Figure 11:
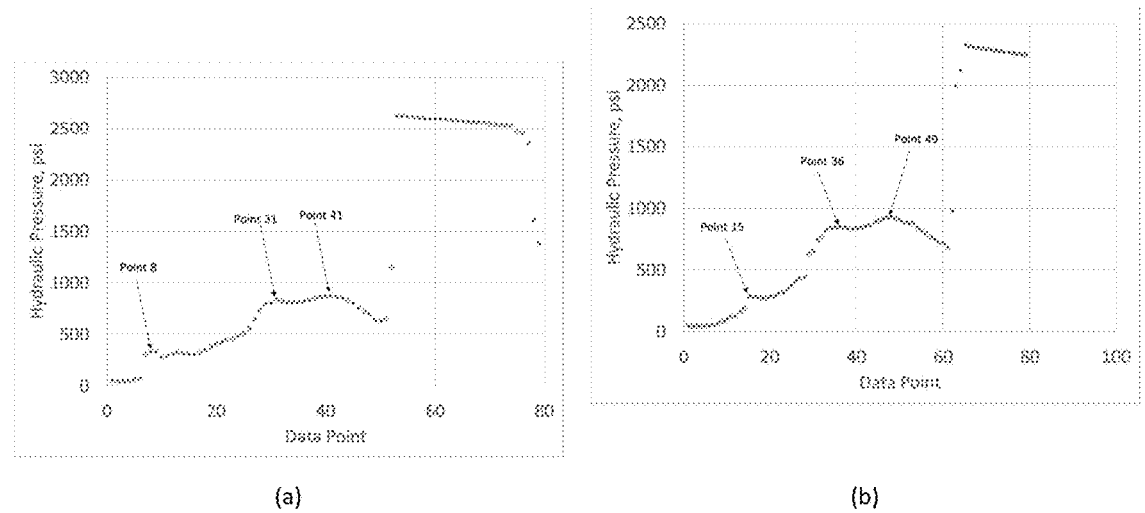
FIG. 11 compares raw data obtained from a system as described for bales formed with a net wrap at (a) and a twine wrap at (b).

FIG. 11 at (a) presents the pressure transducer response for a single bale that was net wrapped when plotted as a function of sequentially collected data points. Third order peaks were observed for this dataset at data points 31, 41 and 8. The peak at point 8 was assumed to be linked to mechanical friction in the kicker assembly due to the fact that it was observed on virtually all bales at about the same pressure, regardless of bale weight. Although not confirmed, it was assumed that the peak at point 8 occurred prior to contact between the bale and kicker assembly. Data point 31 was considered the first associated peak and data point 41 was considered to be the second associated peak.

FIG. 11 at (b) presents raw data from a bale that was twine wrapped. The same trend was seen in all datasets, in which the first peak appeared to be due to contact between the bale and the kicker assembly, at which point the bale was momentarily lifted off of the kicker assembly, followed by the second peak where the bale once again made contact with the kicker assembly. The time between peaks was consistently about 0.2 sec. The time between peaks and the presence of the first peak was believed due to the bale "jumping" as it was ejected from the bale chamber and contacted the kicker plate. When the bale chamber was opened and the bale first contacted the kicker, the data suggest that the first peak that was not associated with mechanical friction was a result of a bounce of the bale and providing the 0.2 seconds between the first and second peak.

This understanding was supported in observing the differences exhibited between net and twine wrap for bales. The twine wrapped bales were less dense than the net wrapped bales which caused a decrease in acceleration of the bale as it left the bale chamber and an increase in drag, causing the first peak on the twine wrapped bales to be less distinct than that on the net wrapped bales.

Figure 12:
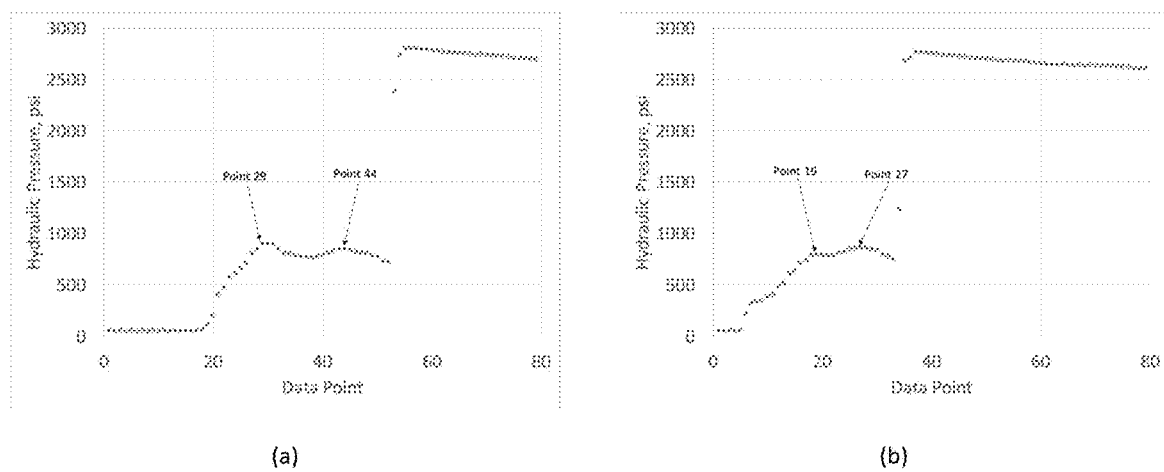
FIG. 12 compares raw data from bales wrapped with net wrap at (a) and with twine wrap at (b).

FIG. 12 presents raw data that was collected from the John Deere 459 Silage Special. FIG. 12 at (a) presents data that was collected from a bale that was net wrapped while the data at (b) was from a bale that was twine wrapped. The John Deere 459 did not display the first peak which was attributed to mechanical friction like the 458 did. The data from the two balers were similar in that there were two peaks close together within the data.

Figure 13:
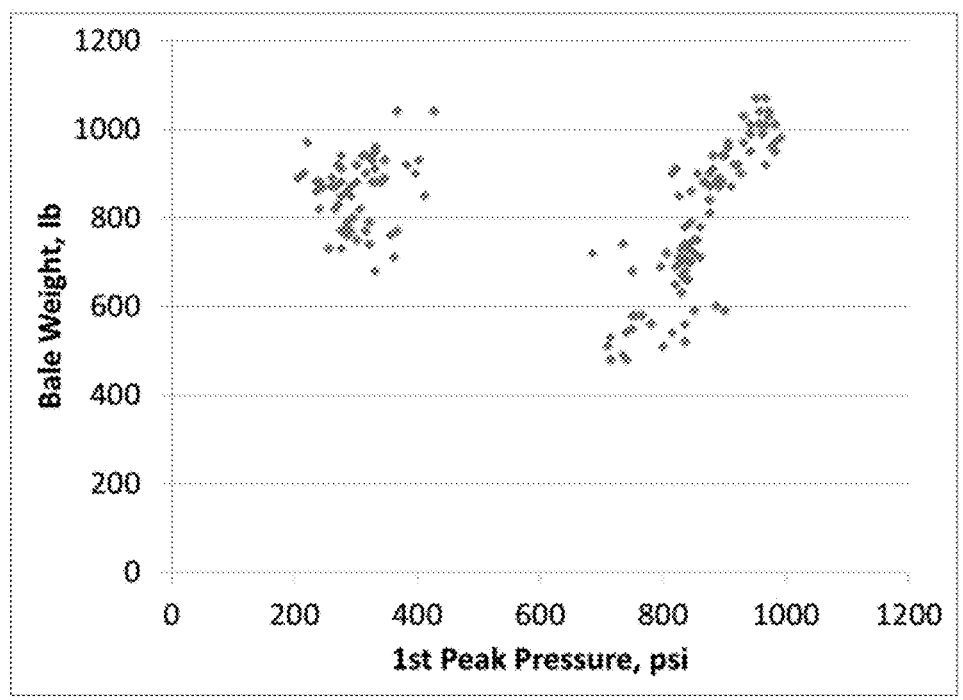
FIG. 13 compares the relationship between bale weights and a first pressure peak at (a) and a second pressure peak at (b).
Figure 13:
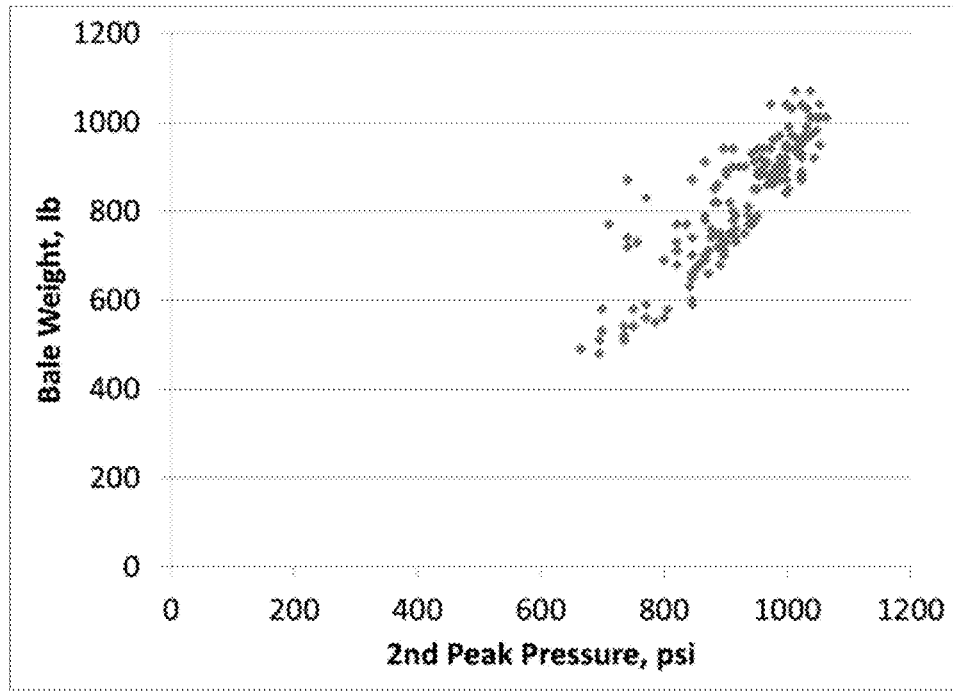

FIG. 13 displays first peak information at (a) and second peak information at (b) and how each correlated to bale weight. As demonstrated at (a), there appears to be two datasets. The first dataset, between approximately 200 and 400 psi are the peaks that were referred to as mechanical friction that could be attributed to the hydraulic system with no correlation to bale weight. Initially, the first peak in the stated range was assumed to be associated with a lower bale density because it was observed more in bales that were twine wrapped, but after further analysis, it was concluded that it was the mechanical friction. Without the first peak being pronounced in all bales, it was concluded that it could not be used in analysis. In FIG. 13 at (b), there is a much tighter correlation between hydraulic pressure (psi) and bale weight (lb). The second peak was consistently observed in the data for all bales, regardless of the method used for wrapping.

Figure 14:
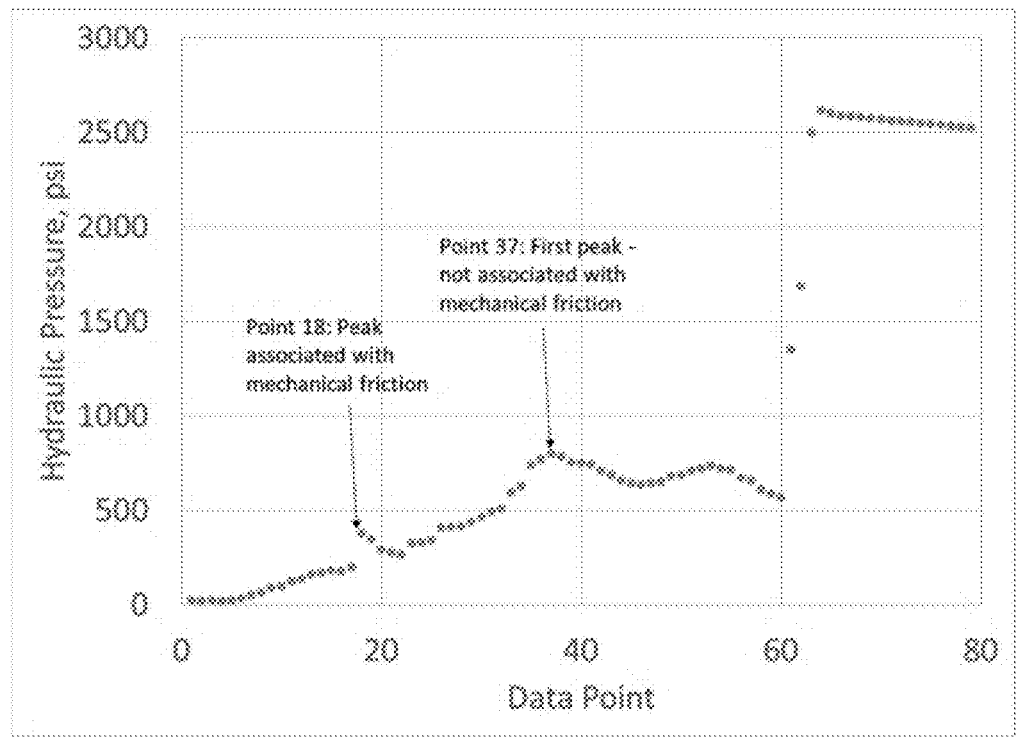
FIG. 14 compares data with (a) and without (a) the pronounced first peak that was attributed to mechanical friction.
Figure 14:
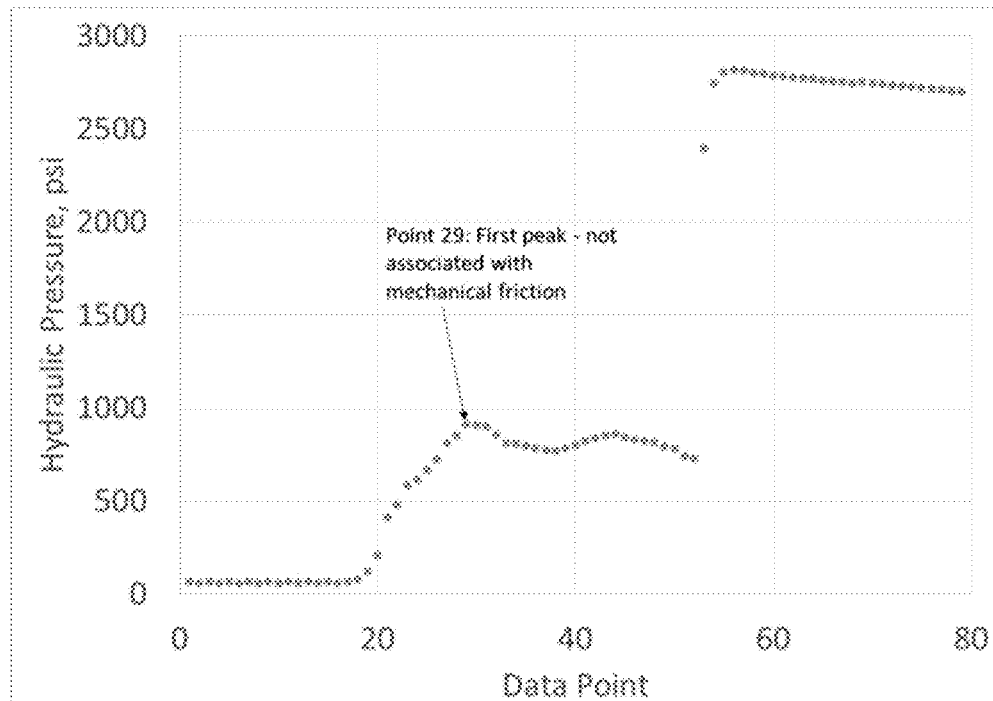

In FIG. 14, two plots of raw data are displayed. The data shown at (a) includes a pronounced peak that can be associated with mechanical friction. A point such as point 18 (a) is not displayed included in the data at (b). Comparisons such as this give justification to the removal of the friction related peak from analysis and only using the second associated peaks.

Because the 2nd pressure peak demonstrated a consistent relationship with bale weight across all bales, it was used as an independent variable in development of linear regression models to predict bale weight. Table 1 below demonstrates the results of bale weight prediction models across multiple breakdowns of the data collected in this study. Throughout Table 1, the data was divided according to the dataset. Data confined between double borders come from one instance of harvest. Single borders divide the data according to bale size.

It was concluded from the table that when N was small, the data was slightly skewed to be lower than if N was greater. This table demonstrates that in most cases, analysis for a particular size or a particular method of wrapping the bale produces a lower average absolute error. It is also important to calibrate and analyze data according to the equipment used because all pieces of equipment will react differently to different loads.

TABLE 1

| Baler | Wrap Type | Bale Diameter | N | Avg. Abs. Error, % | Avg. Abs. Error, (lb) |
| --- | --- | --- | --- | --- | --- |
| 458 | Net | 60" | 31 | 5.79 | 39.22 |
| 458 | Twine | 60" | 19 | 5.41 | 42.52 |
| 458 | Mixed | 60" | 50 | 9.46 | 65.22 |
| 458 | Net | 48" | 5 | 5.41 | 33.97 |
| 458 | Twine | 48" | 5 | 2.48 | 13.98 |
| 458 | Mixed | 48" | 10 | 4.27 | 25.99 |
| 458 | Net | 54" | 4 | 7.28 | 58.44 |
| 458 | Twine | 54" | 8 | 1.91 | 13.55 |
| 458 | Mixed | 54" | 12 | 5.34 | 40.96 |
| 458 | Net | 60" | 13 | 3.63 | 31.02 |
| 458 | Twine | 60" | 3 | 0 | 0 |
| 458 | Mixed | 60" | 16 | 4.66 | 40.32 |
| 458 | Net | Mixed | 22 | 6.42 | 48.89 |
| 458 | Twine | Mixed | 16 | 7.57 | 56.01 |
| 458 | Mixed | Mixed | 36 | 7.00 | 53.19 |
| 458 | Net | 60" | 20 | 3.95 | 37.31 |
| 458 | Net | 60" | 17 | 3.32 | 33.02 |
| 459 | Net | 48" | 5 | 2.68 | 16.95 |
| 459 | Twine | 48" | 4 | 3.28 | 23.34 |
| 459 | Mixed | 48" | 9 | 5.65 | 38.19 |
| 459 | Net | 54" | 3 | 1.10 | 8.57 |

TABLE 1-continued

| Baler | Wrap Type | Bale Diameter | N | Avg. Abs. Error, % | Avg. Abs. Error, (lb) |
| --- | --- | --- | --- | --- | --- |
| 459 | Twine | 54" | 5 | 2.91 | 22.14 |
| 459 | Mixed | 54" | 8 | 2.64 | 20.33 |
| 459 | Net | 60" | 4 | 1.79 | 16.73 |
| 459 | Twine | 60" | 3 | 3.32 | 30 |
| 459 | Mixed | 60" | 7 | 2.44 | 22.13 |
| 459 | Net | Mixed | 11 | 5.31 | 38.23 |
| 459 | Twine | Mixed | 12 | 5.79 | 46.20 |
| 459 | Mixed | Mixed | 23 | 7.16 | 52.88 |

Figure 15:
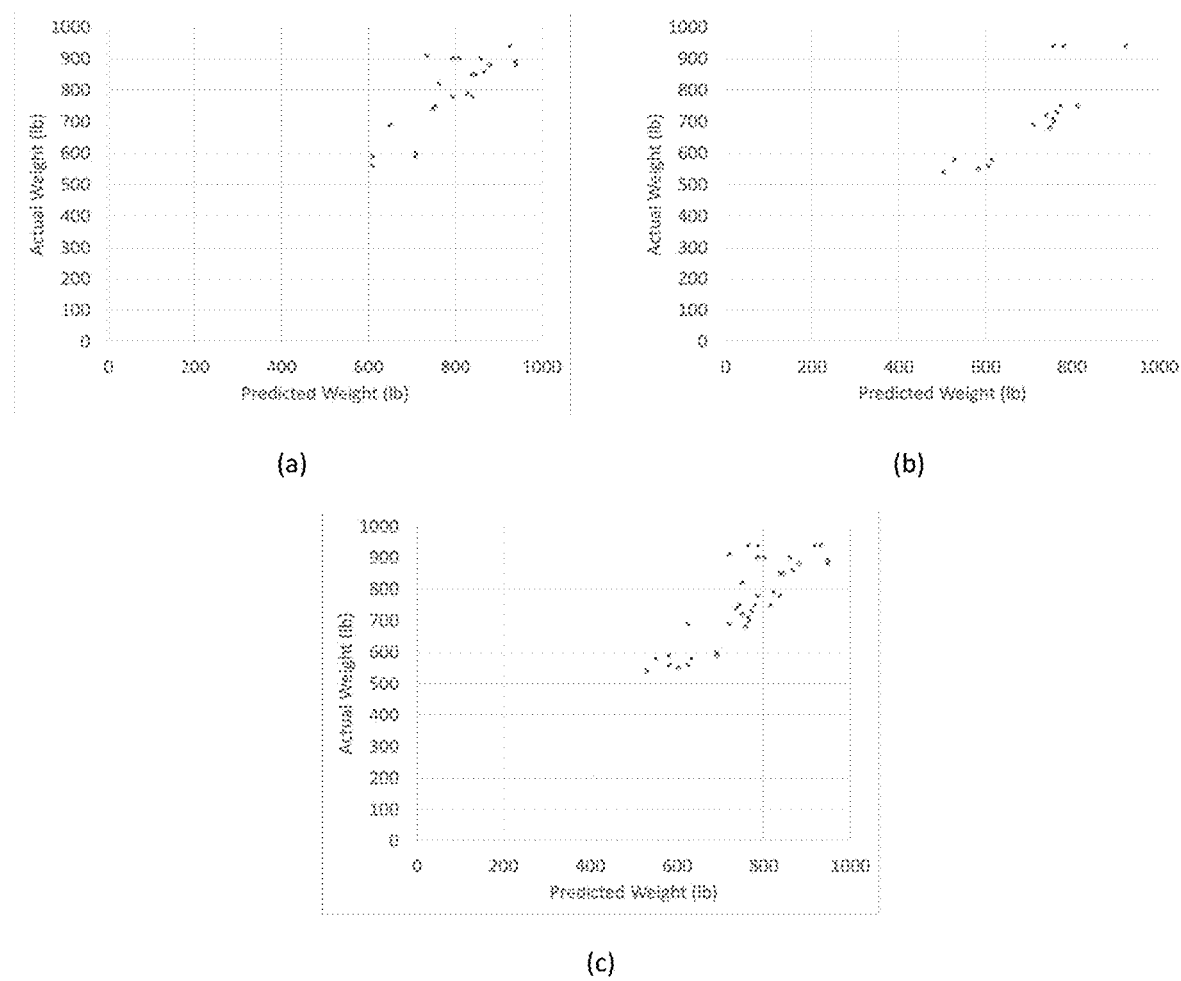
FIG. 15 compares the relationship between actual weight and predicted weight as a function of (a) net, (b) twine, or (c) both methods of baling.

FIG. 15 compares actual vs. predicted bale weights for some of the scenarios exhibited in Table 1 from the John Deere 458 baler. FIG. 15 at (a) exhibits plots predicted weight (lb) against actual weight (lb) for 22 bales that were net wrapped with average absolute error of 6.42%. FIG. 15 at (b) presents data of 16 bales that were twine wrapped that produced an average absolute error of 7.57%. At (c) FIG. 15 presents data from all bales and provides a combined average absolute error of 7.00%.

Figure 16:
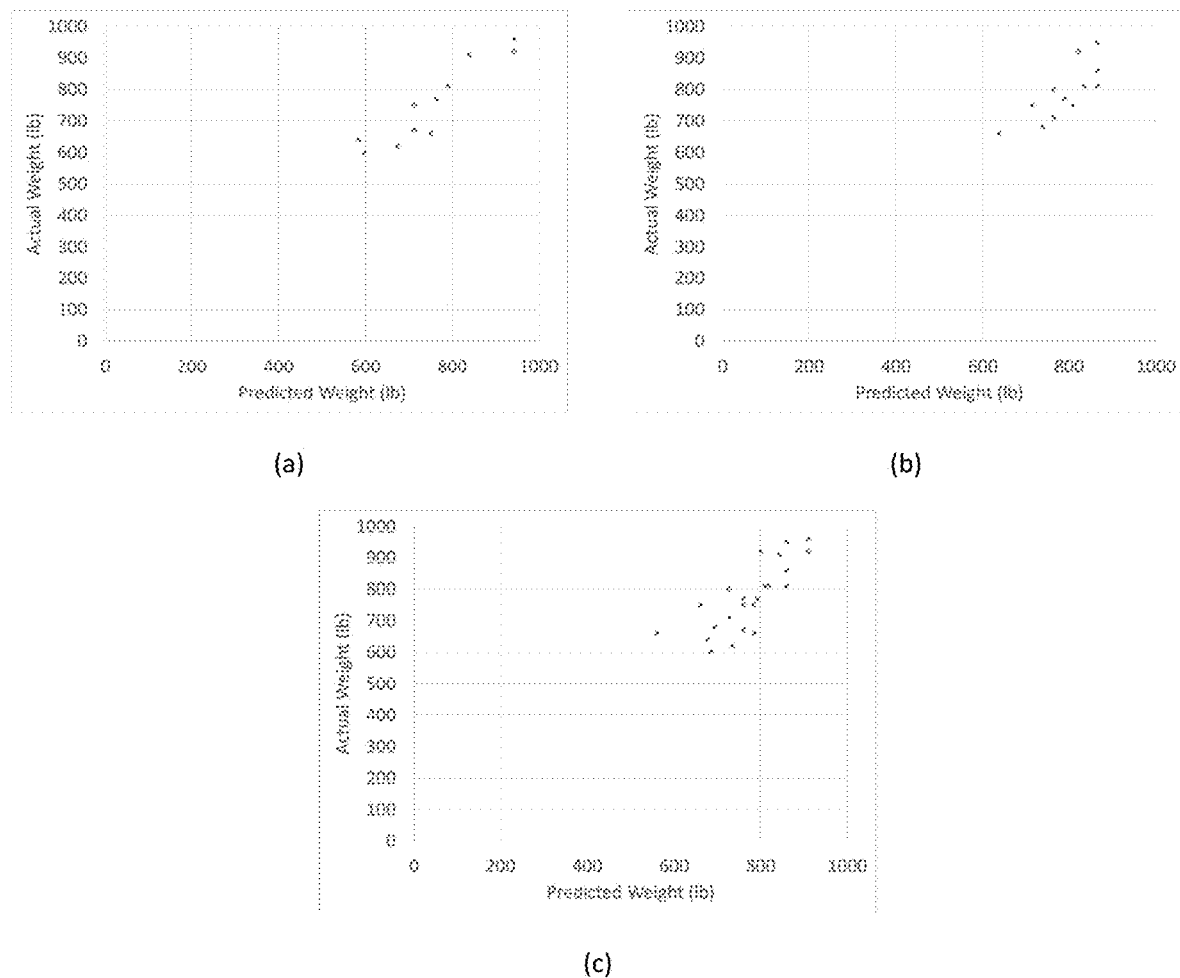
FIG. 16 compares the relationship between actual weight and predicted weight as a function of (a) net, (b) twine, or (c) both methods of baling with a different baler than was used for the data of FIG. 13.

FIG. 16 compares the data for net (a), twine (b), and all bales (c) that were baled by the John Deere 459 Silage Special. FIG. 16 at (a) displays an average absolute error of 5.31% for 11 net wrapped bales. FIG. 16 at (b) contained 12 twine wrapped bales with an average absolute error of 5.79%. The combined data demonstrated an average absolute error of 7.16%.

The necessity of calibrating according to the size of the bale was also examined. In one instance, three different size bales were baled. The total number of bales used for analysis was 12 but there were divided up as to whether they were net wrapped or twine wrapped and bale diameter. Among these were 9-48 in., 8-54 in., and 7-60 in. bales that used either net or twine. When the analysis was carried out, average absolute error was calculated for the independent sizes and for all bales. As shown in Table 2, average absolute error was greatest for mixed bales.

TABLE 2

| Bale Diameter, in. | N | Wrap Type | Avg. Abs. Error, % |
| --- | --- | --- | --- |
| 48 | 5 | Net | 2.7 |
|  | 4 | Twine | 3.3 |
| 54 | 3 | Net | 1.1 |
|  | 5 | Twine | 2.9 |
| 60 | 4 | Net | 1.8 |
|  | 3 | Twine | 3.3 |
| Mixed | 11 | Net | 5.3 |
|  | 12 | Twine | 5.8 |

A field that produced 23 bales during harvest was used to examine whether different calibration methods affect the weight prediction. The method included random selection of 3 bales of a specific size that were net wrapped and regression models were then built based off of those 3 bales. Of the regression models built, one consisted of using 3-48 in. bales, one consisted of using 3-60 in. bales and one consisted of using 1 of each size, 48 in., 54 in., and 60 in. Table 3 shows the average absolute errors produced when the different regression models consisting of only 3 bales each were used to predict weight for the rest of the bales. The 48 in. calibration produced lower errors than that of the 60 in. calibration model. When 3 bales of different sizes were selected for the use of calibration, average absolute error as applied across the 23 bales displayed a drastic decrease.

TABLE 3

| Bale Diameter, in. | Wrap Type | Avg. Abs. Error, % |
|---|---|---|
| 48 | Net | 11.7 |
| 60 | Net | 26.1 |
| Mixed | Net | 7.6 |

Example 2

Figure 17:
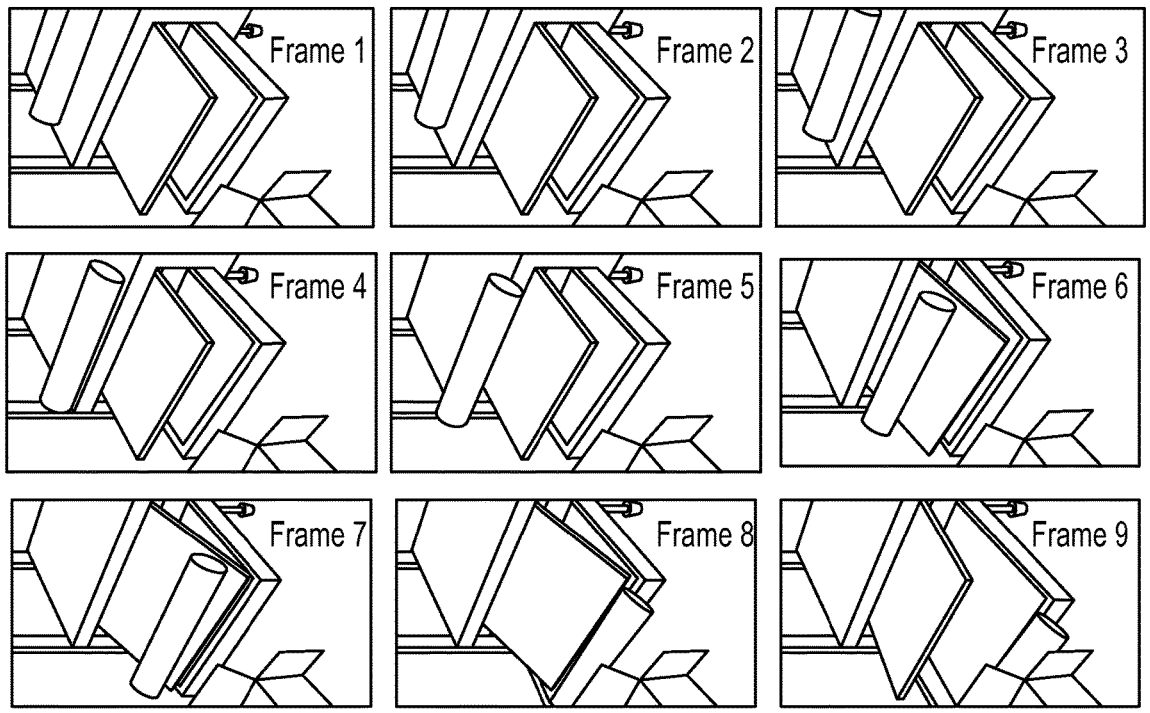
FIG. 17 includes a series of video frames demonstrating a method as disclosed herein.

A model 1042 Phidgets Spatial 3/3/3 was utilized as a sensor on an off-ramp type round baler. The sensor was equipped with a 3-axis compass, a 3-axis gyrometer, and a 3-axis accelerometer. A scaled bale ramp was constructed from 2 inch angle iron and plywood was used for the platform. Similar to spring loaded ramps found on a variety of hay balers, the model ramp was also designed with springs in the rear to hold the platform horizontal when under no load. When a cylinder (representing a bale) made contact with the platform, the weight of the cylinder caused the platform to tilt because the springs were positioned to support a weight just slightly greater than that of the platform alone. This tilt caused the cylinder to gain forward momentum and roll off the end of the platform. Once the cylinder rolled off of the platform the springs, which had been put under tension, returned to their resting state, thus returning the platform to the horizontal position. FIG. 17 contains video frames that illustrate the general bench testing methodology. In frames 1-4, the weighted cylinder rolls from a defined start position on the stationary off-loading ramp. In frame 6, the weighted cylinder contacts the spring-loaded ramp. Frames 6-8 illustrate how the angular velocity of the spring-loaded ramp is measured as the ramp pivots. In frame 9, the spring-loaded ramp returns to a resting position after the weighted cylinder exits the ramp.

The weights used in these tests were constructed using concrete-filled PVC pipe of two different diameters across a range of lengths. Bench tests were conducted with the various PVC cylinders being dropped from an inclined, stationary ramp to ensure the drops were consistent and repeatable throughout. By dropping or rolling the cylinders from the stationary ramp onto the pivoting spring-loaded ramp, all of the following could be maintained as controlled variables: drop position, drop height, start position, and angle of the off loading ramp.

Figure 18:
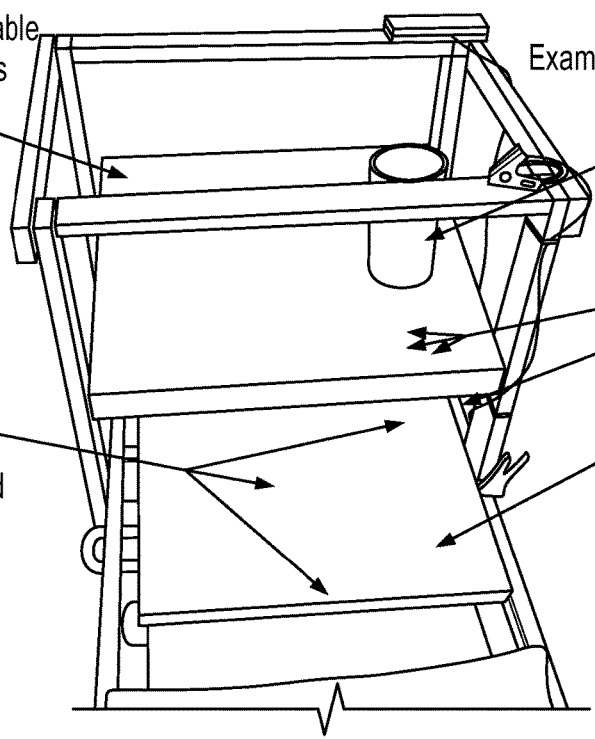
FIG. 18 illustrates a model spring-loaded bale ramp and stationary ramp used for bench testing a system.

FIG. 18 illustrates the arrangement of components used for the testing. The 1042 Phidgets Spatial 3/3/3 device was mounted in three different locations on the underside of the spring loaded ramp: first on the end farthest from the pivot point, second in the center of the ramp, and lastly on the left side directly in front of (down ramp from) the ramp pivot point. Each sensor position yielded different results despite the care taken in dropping the cylinders from the same location every time. Tests conducted with the sensor at the end of the ramp, and the sensor at the center of the ramp generated relatively inconsistent results between replications that were more difficult to correlate a peak rate of angular change with cylinder weight. It was suspected that this was caused from the lightweight construction and lack of rigidity of the model bale ramp; the weighted cylinders caused a substantial amount of vibration when they struck the ramp platform. This vibration was picked up by the gyrometer and attributed to noise in the data when the sensor was placed in the center of the ramp and at the very front of the ramp.

Figure 19:
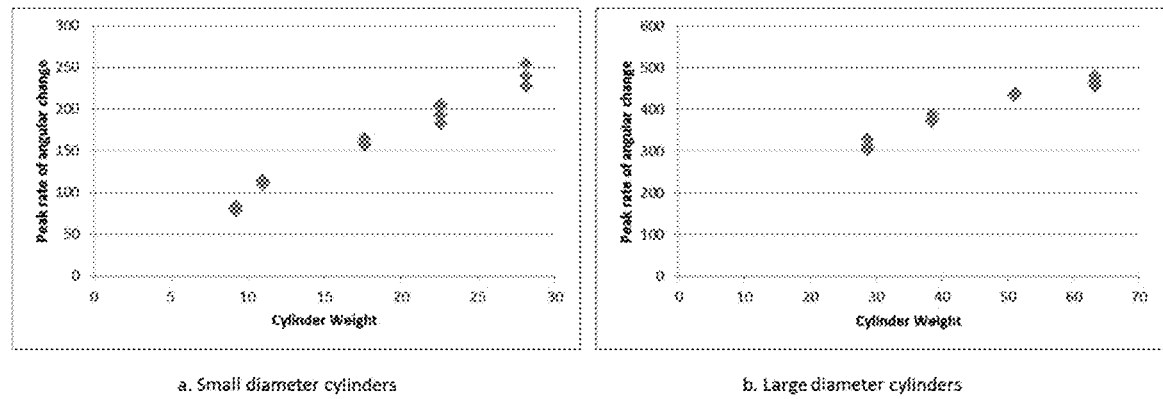
FIG. 19 presents the relationship between peak angular velocity (degrees per second) of a bale ramp and cylinder weight (lb) for a system as described herein.

When the gyrometer was located directly in front of the pivot point a distinct correlation with good repeatability between replicate trials could be seen between the actual weight of the cylinder dropped and the peak rate of angular change of the bale ramp, as shown in FIG. 19. Data was recorded at 125 Hz; for the purposes of developing the charts in FIG. 19, a peak was defined as any average of three readings greater than the twenty prior and twenty subsequent three reading averages. The peak rate of angular change shown in FIG. 19 was for the axis with the greatest peak, the y-axis, which is dependent on sensor mounting orientation.

Figure 20:
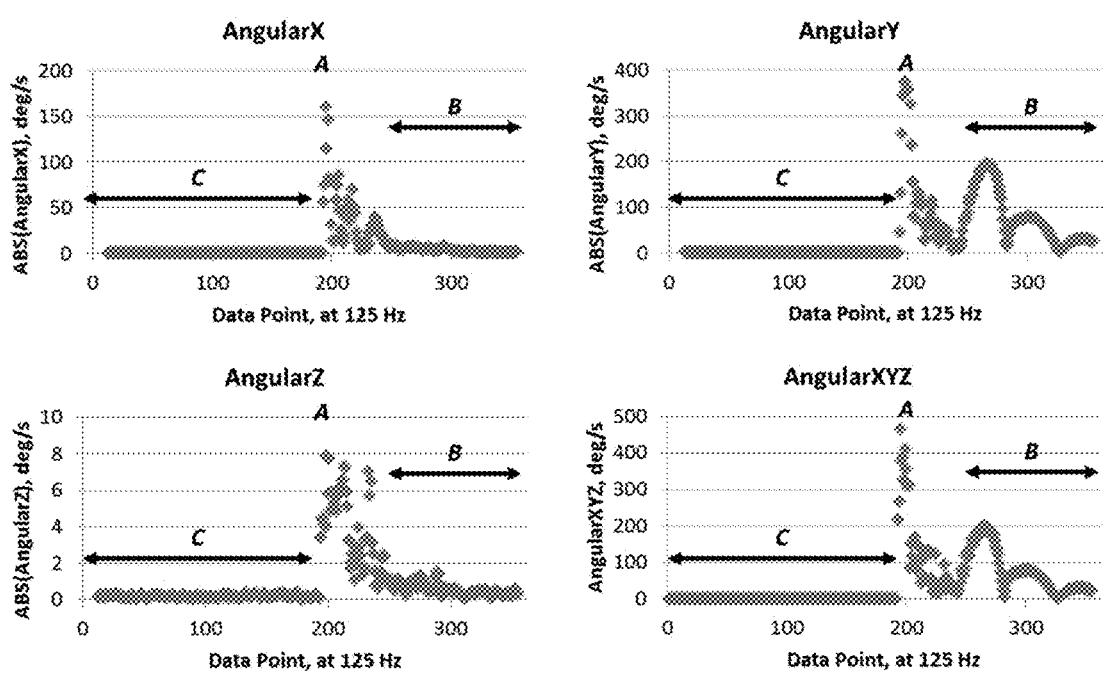
FIG. 20 provides gyrometer data from a system as disclosed herein.

The gyrometer data for one of the tests is shown in FIG. 20, demonstrating the peaks referred to here. Peak angular speed is indicated by "A" in each of the plots. The range of data indicated at "B" in each figure represents the spring-loaded ramp rebound and the range of data indicated at "C" represents the period of time prior to the weighted cylinder contacting the spring-loaded ramp. Each data point represents a three point average. The charts labeled AngularX, AngularY, and AngularZ use the absolute value of the angular rate for each axis. The chart labeled AngularXYZ represents the composite rate of angular change as described.

Similar results are seen when assessing the composite rate of angular change of all three axes, calculated as the square root of the sum of the squares of each angular change. The advantage of using the composite rate of angular change is that it is independent of sensor mounting orientation. Placing the sensor directly in front of the pivot where vibration was minimal, yielded assuring results that the weight of an object free falling onto a spring loaded platform can be correlated to the rate at which the angle of the platform changes. Accelerometer data was also collected and analyzed. The greatest resolution in accelerometer data was seen when the device was mounted farthest from the bale ramp pivot point. Noise was reduced to an acceptable level for the accelerometer when the device was mounted near the pivot point.

Figure 21:
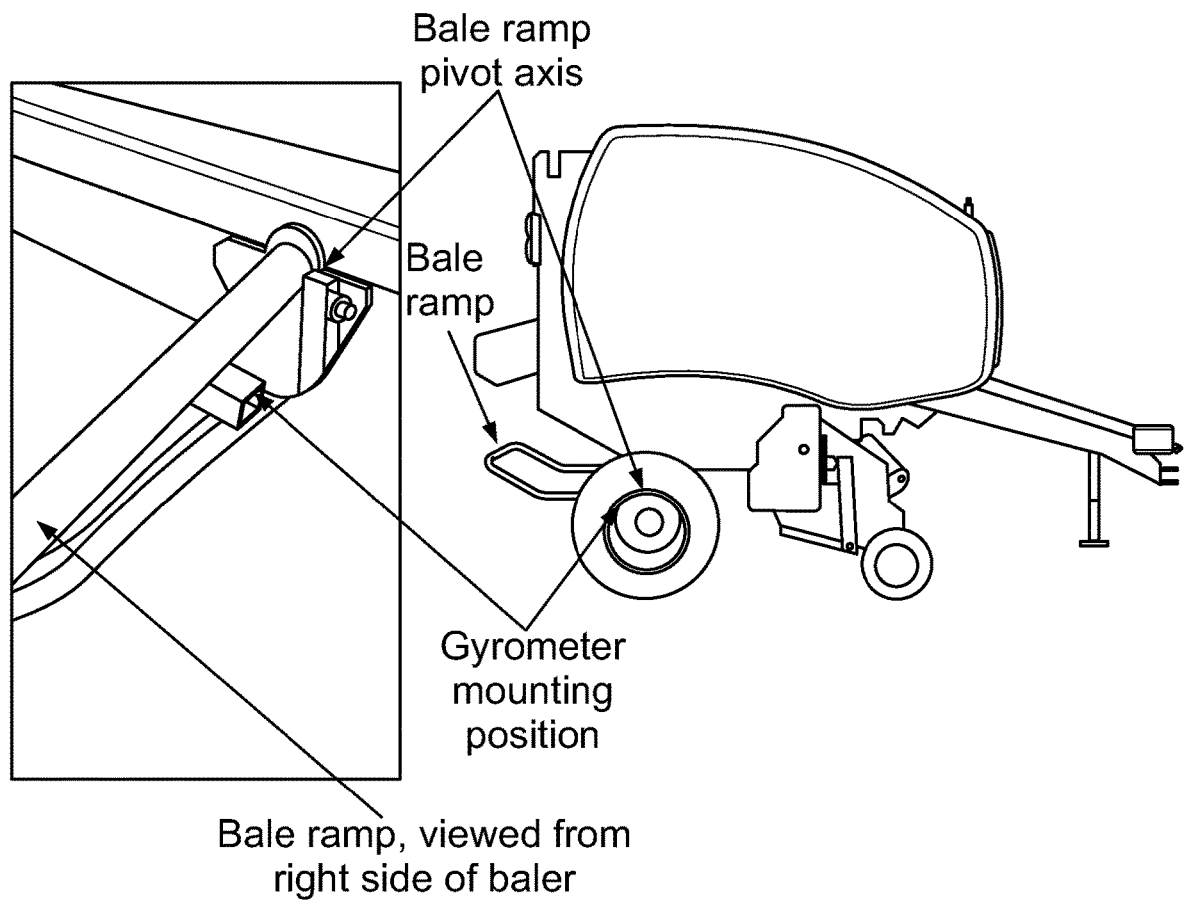
FIG. 21 illustrates a mounting position for a gyrometer on the off-ramp of a round baler.

To evaluate suitability and performance of this technology when installed on a working round hay baler, a 1042 Phidgets device was mounted near the pivot point of the bale ramp on a Roll Belt Model 450 Silage Special (New Holland) round baler as depicted in FIG. 21. The data acquisition was configured to record gyrometer data at 125 Hz at each discharge of a bale, as indicated by a bale chamber switch.

Figure 22:
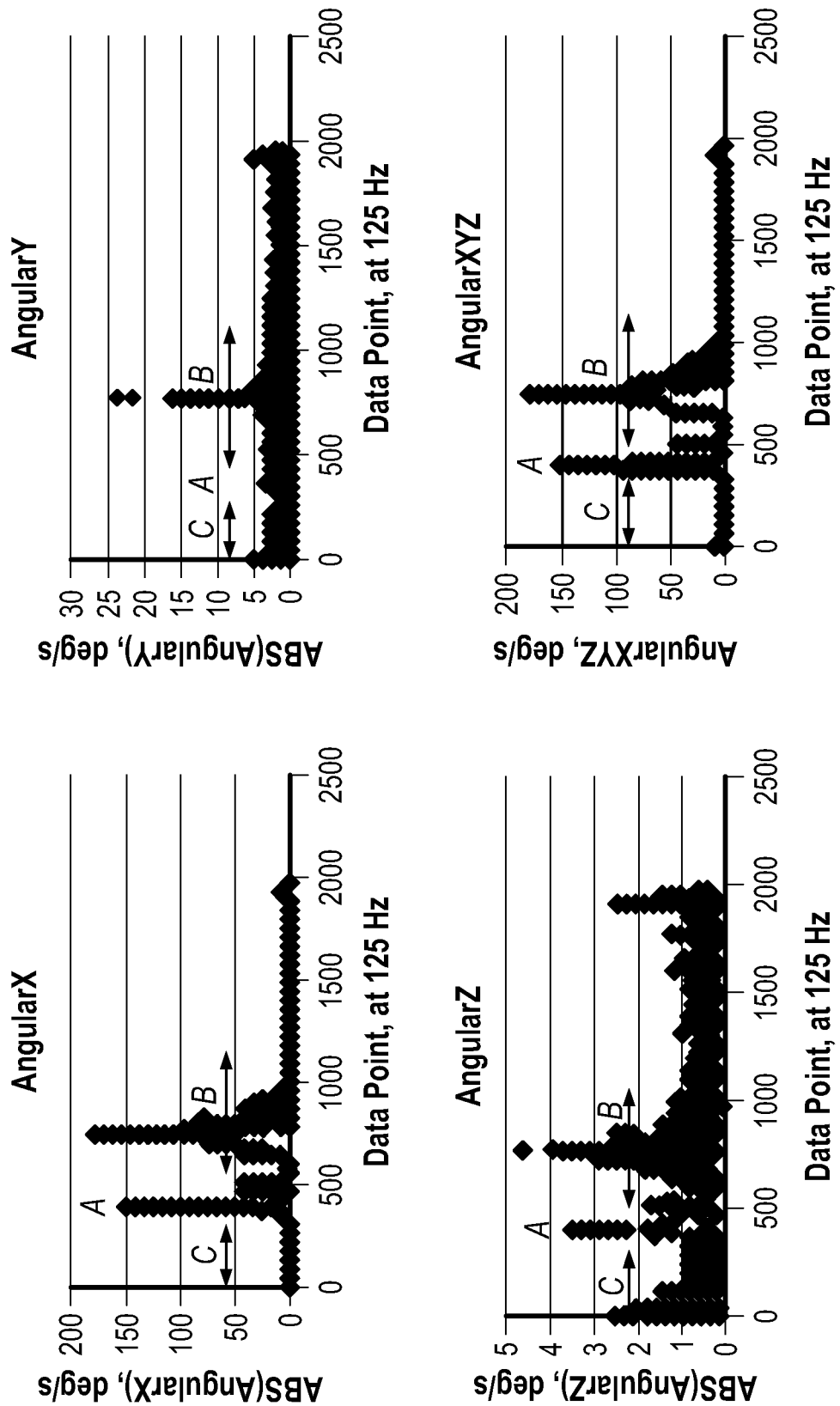
FIG. 22 provides gyrometer data from a system as illustrated in FIG. 19.

Gyrometer data from one bale discharge is shown in FIG. 22. The peaks that can be correlated to bale weight are indicated by "A" in each of the plots. The range of data indicated at "B" in each figure represents the bale ramp rebound and the range of data indicated at "C" represents the period of time prior to the bale contacting the bale ramp. Each data point represents a three point average. The charts labeled AngularX, AngularY, and AngularZ use the absolute value of the angular rate for each axis. The chart labeled AngularXYZ represents the composite rate of angular change as described. Results suggest that the general relationships demonstrated in the bench tests between gyrometer data and PVC cylinder weight were transferable to application on a working round baler.

Example 3

Figure 23:
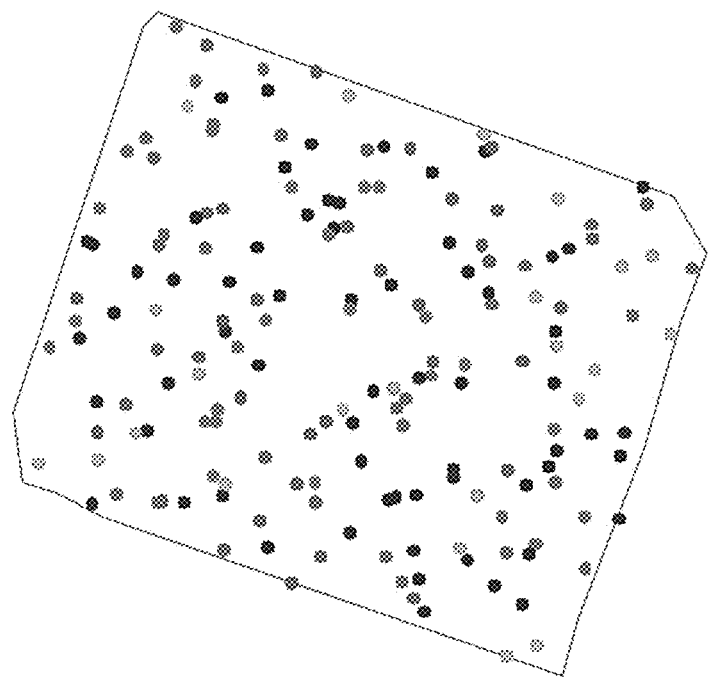
FIG. 23 provides a yield map showing the bale positions of 174 bales formed in a 25 acre field.

A 24.9 ac hay field was harvested yielding 174 bales, which averaged 1000 lb each. Individual bale weight data such as that obtained from use of a pressure transducer coupled with a hydraulic bale ramp kicker as illustrated in FIG. 6 was merged with bale ejection GPS position data. The map thus obtained is provided in FIG. 23.

Figure 24:
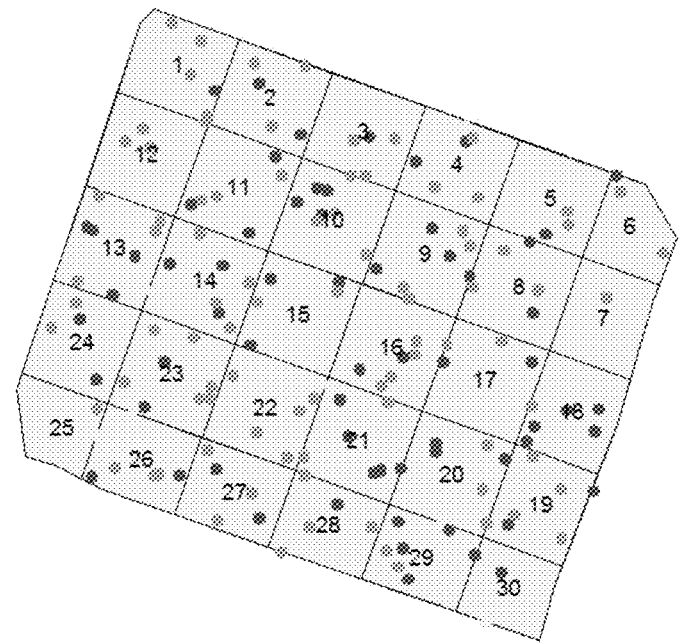
FIG. 24 illustrates the yield map of FIG. 23 broken into a 200 ft. grid pattern forming 30 polygons.
Figure 25:
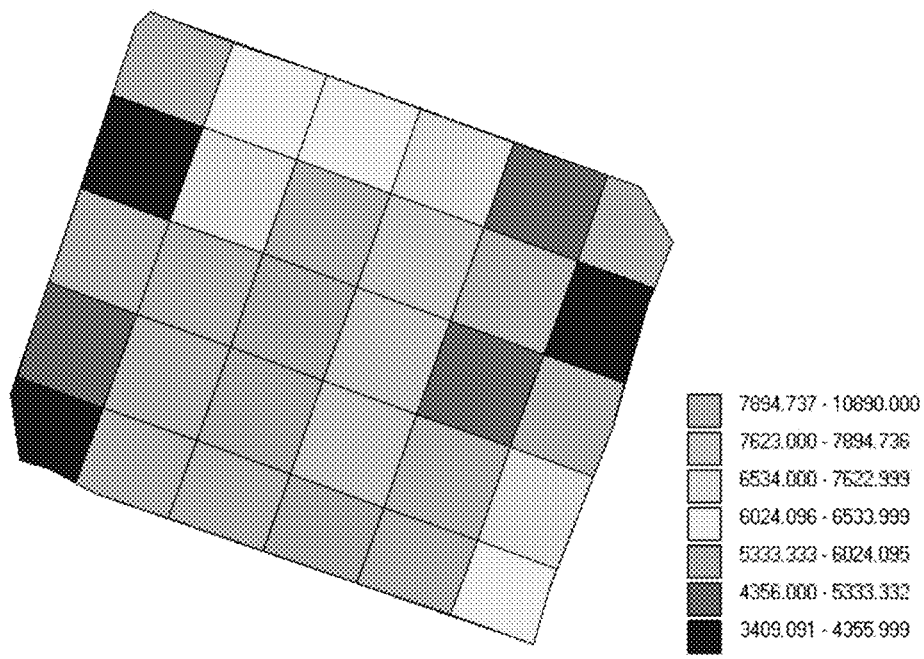
FIG. 25 provides a yield map (lb/acre) generated using bale weights and GPS positions as distributed across the 200 ft. grid polygons of FIG. 24.
Figure 26:
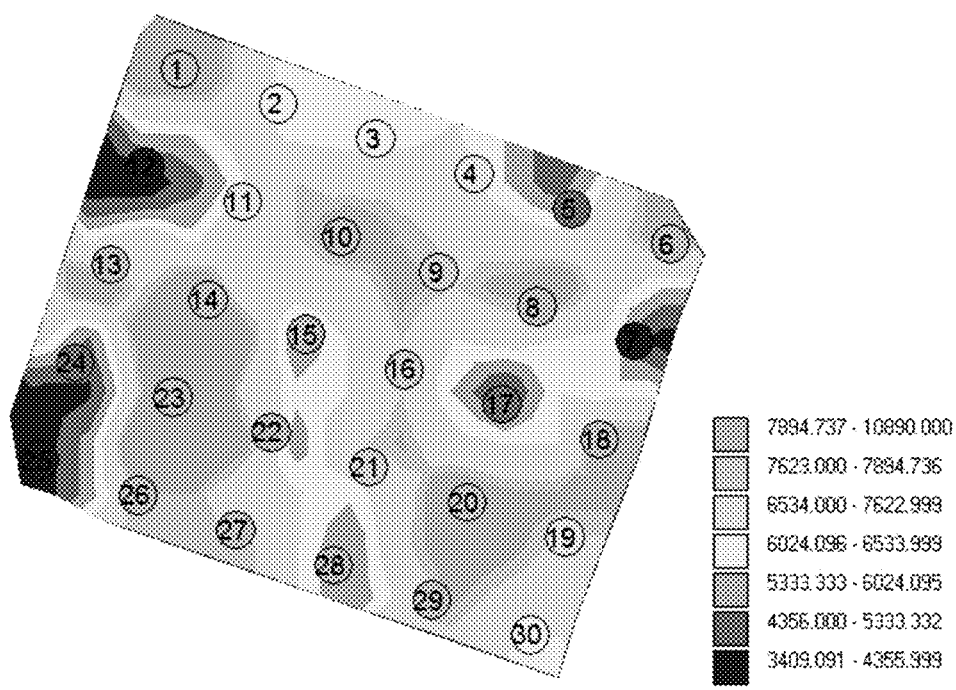
FIG. 26 provides a contoured yield map generated from bale weights and positions as assigned to 200 ft grid polygons of FIG. 24 with centroid points and yields for each polygon (overlaid).

A 200 ft grid polygon was defined for the field, resulting in 30 polygons, each with an average area of 0.83 ac. Bales were assigned to the 200 ft grid polygons on the basis of bale ejection GPS position (FIG. 24). Summation of bale weights (lb) within each polygon divided by area (ac) of each polygon allowed for calculation of yield by polygon (lb/w), as seen in Table 4 and FIG. 25. Assigning the average yields from Table 4 to the centroid points from each 200 ft grid polygon allowed for creation of a contoured yield map, as shown in FIG. 26.

TABLE 4

| Polygon ID | Yield, lb/ac |
| --- | --- |
| 1 | 8642 |
| 2 | 6024 |
| 3 | 6024 |
| 4 | 7229 |
| 5 | 4819 |
| 6 | 8333 |
| 7 | 3896 |
| 8 | 8712 |
| 9 | 7623 |
| 10 | 8712 |
| 11 | 6534 |
| 12 | 3409 |
| 13 | 9195 |
| 14 | 8712 |
| 15 | 5445 |
| 16 | 7623 |
| 17 | 4356 |
| 18 | 8642 |
| 19 | 7500 |
| 20 | 8712 |
| 21 | 7623 |
| 22 | 5445 |
| 23 | 10890 |
| 24 | 4706 |
| 25 | 3509 |
| 26 | 7895 |
| 27 | 7895 |
| 28 | 5333 |
| 29 | 8219 |
| 30 | 6349 |

These and other modifications and variations of the present invention may be practiced by those of ordinary skill in the art, without departing from the spirit and scope of the present invention. In addition, it should be understood that aspects of the various embodiments may be interchanged both in whole and in part. Furthermore, those of ordinary skill in the art will appreciate that the foregoing description is by way of example only, and is not intended to limit the invention so further described in such appended claims.

What is claimed is:

1. A system for determining a weight of a round bale, the system comprising:
   a sensor carried by a farm implement continuously determining changes in pressure associated with operation of a bale ejection assembly while said bale ejection assembly is in motion throughout a bale ejection cycle and while a round bale is in motion through said bale ejection assembly during a process of ejecting said round bale from the farm implement;
   a processor configured to process data obtained by the sensor and determine the weight of the round bale as it is being ejected from the farm implement,
   wherein the processor is configured to process data obtained by the pressure sensor throughout a bale ejection cycle; and,
   wherein the processor is configured to determine the weight of the round bale from a set of peaks in the data.

2. The system of claim 1, wherein the farm implement is a baler.

3. The system of claim 1, wherein the farm implement is a round cotton module builder.

4. The system of claim 1, wherein the sensor is a hydraulic pressure sensor.

5. The system of claim 1, wherein the sensor is configured for communication with a hydraulically actuated bale ejection assembly.

6. The system of claim 1, wherein the sensor comprises a gyrometer and/or an accelerometer.

7. The system of claim 6, wherein the sensor is configured for communication with a spring-loaded off ramp.

8. The system of claim 1, further comprising a global positioning system.

9. The system of claim 1, wherein the bale is a net wrapped round bale, a twine wrapped round bale, or a plastic wrapped round bale.

10. A method for determining a weight of a round bale, the method comprising:
    ascertaining by use of a sensor continuous changes in pressure associate with operation of a bale ejection assembly while said bale ejection assembly is in motion throughout a bale ejection cycle and while a round bale is in motion through said bale ejection assembly during a process of ejecting said round bale from a farm implement; and,
    a first processing of data from the sensor to determine the weight of the round bale;
    a second processing of the data obtained by the sensor throughout a bale ejection cycle;
    determining the weight of the round bale from a set of peaks in the data.

11. The method of claim 10, wherein the bale is ejected from a baler.

12. The method of claim 10, wherein the bale is ejected from a cotton module builder.

13. The method of claim 10, wherein the pressure is associated with a contact of the round bale against a bale kicker while said round bale and bale kicker are in motion.

14. The method of claim 13, wherein the pressure is hydraulic pressure associated with a bale kicker.

15. The method of claim 10, including ascertaining by use of the sensor a physical parameter associated with an ejection of the round bale during the bale ejection cycle; wherein the physical parameter is a velocity or an acceleration.

16. The method of claim 15, wherein the velocity is a radial velocity.

17. The method of claim 15, wherein the physical parameter is associated with motion of a spring-loaded off ramp.

18. The method of claim 10, wherein the second processing of the data comprises determining one or more peaks in an output from the sensor.

19. The method of claim 18, wherein the method includes determining one or more third order peaks in the output from the sensor.

20. The method of claim 10, further comprising forming a yield map of an area, the area including a location at which the bale ejection cycle is carried out.

21. The system of claim 5 wherein in the ejection assembly is a bale kicker.

* * * * *